Aug. 4, 1936.  C. BARBIERI  2,049,418
CUP MACHINE
Filed May 25, 1932      18 Sheets-Sheet 2

Inventor
Cesare Barbieri

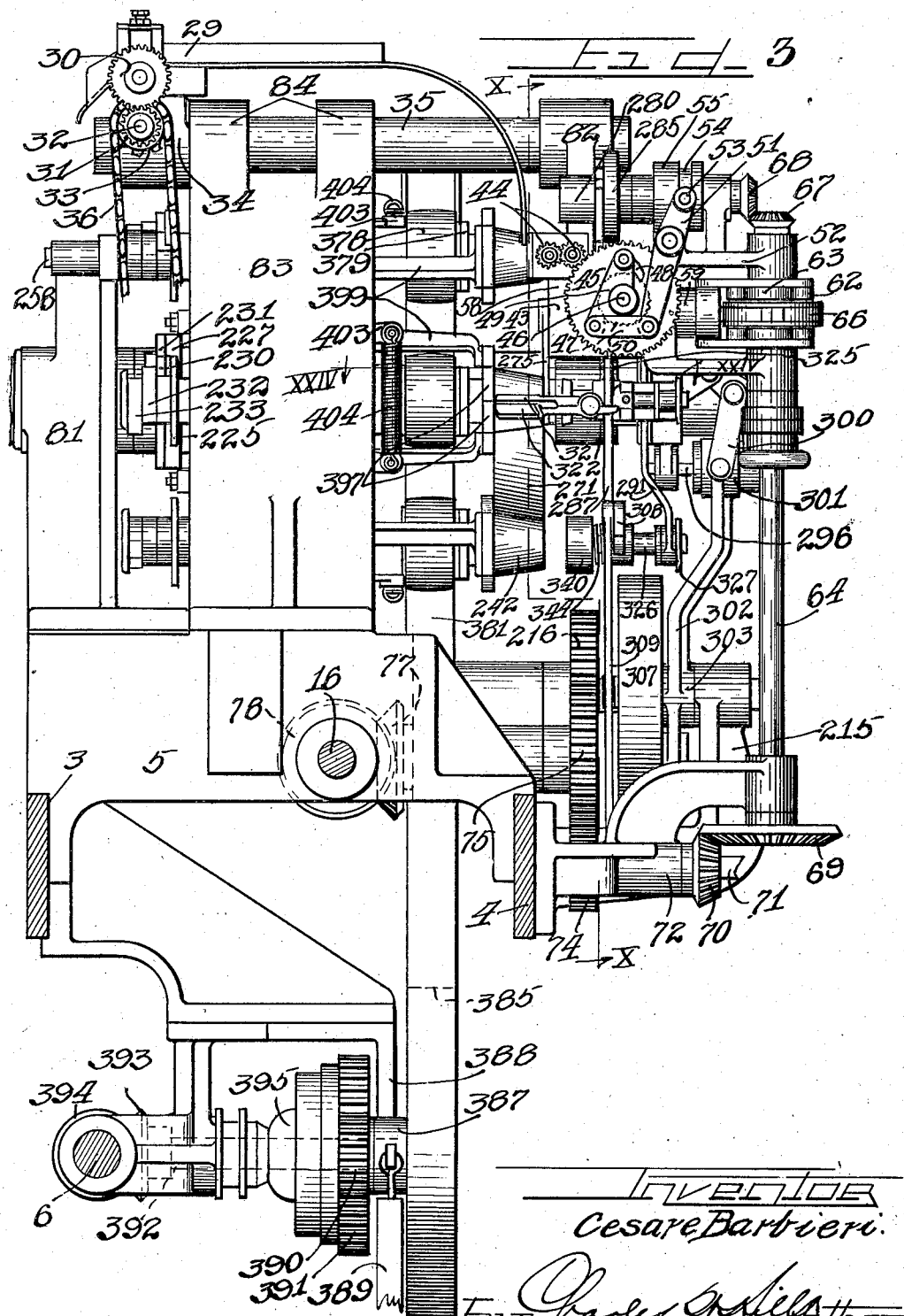

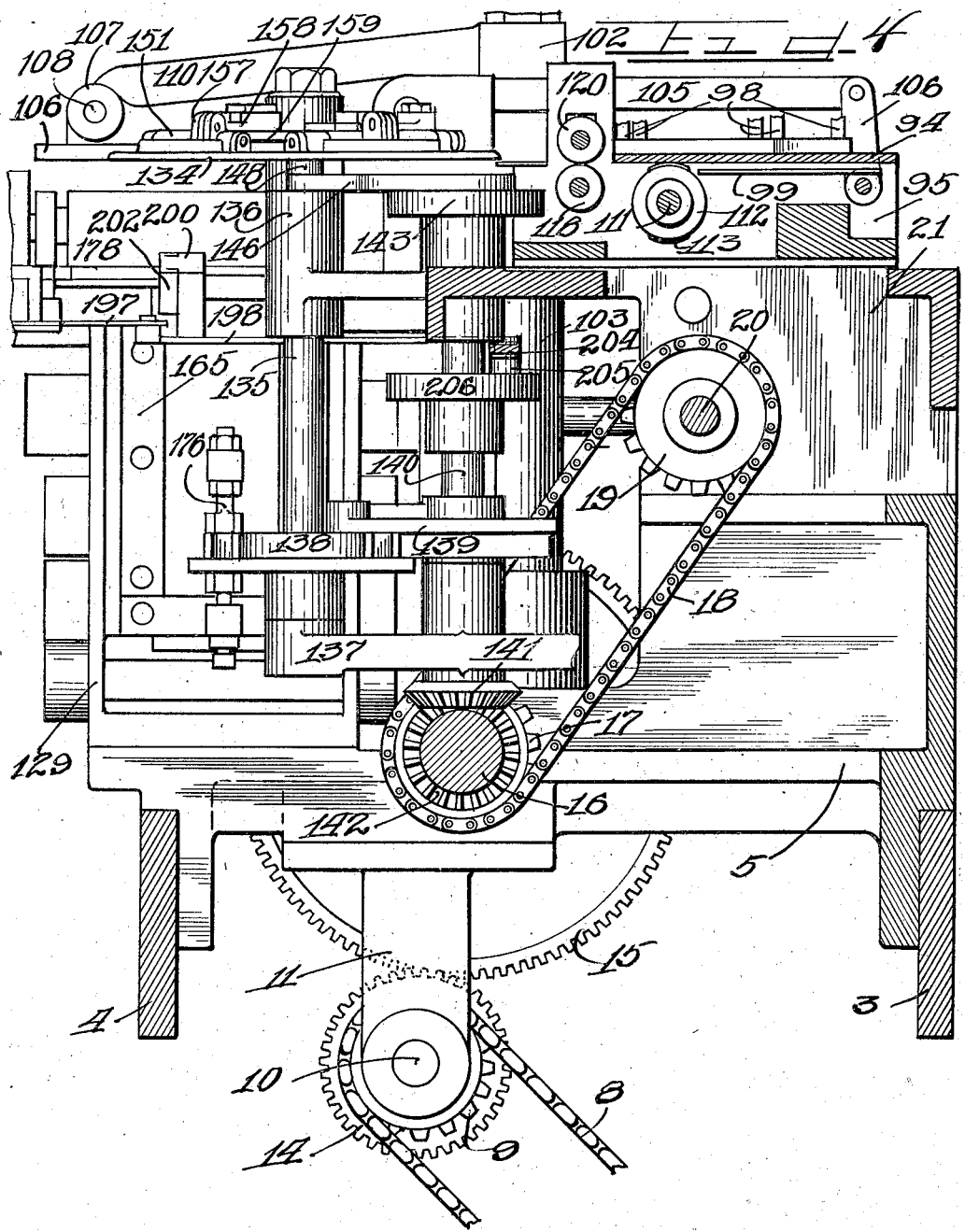

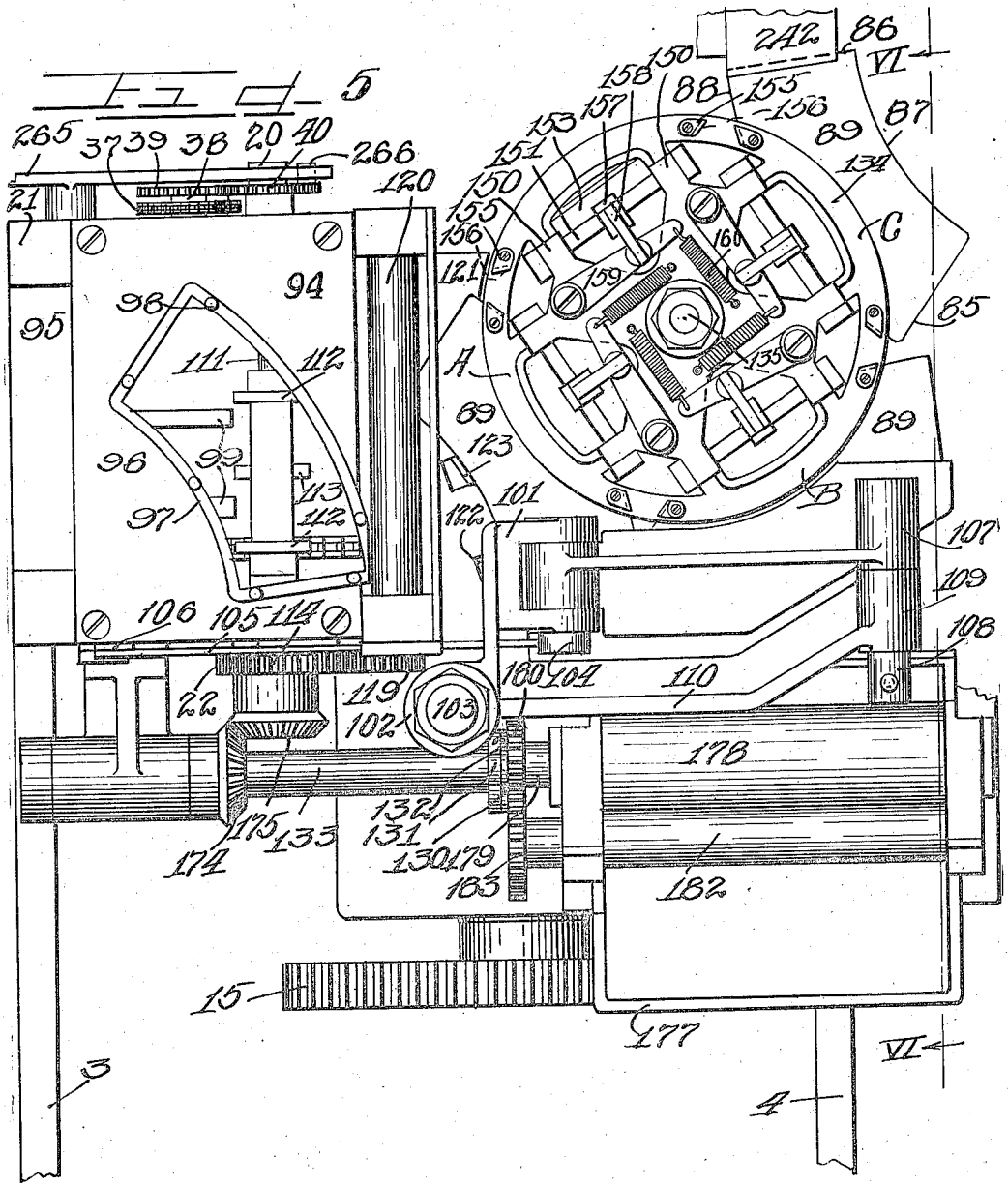

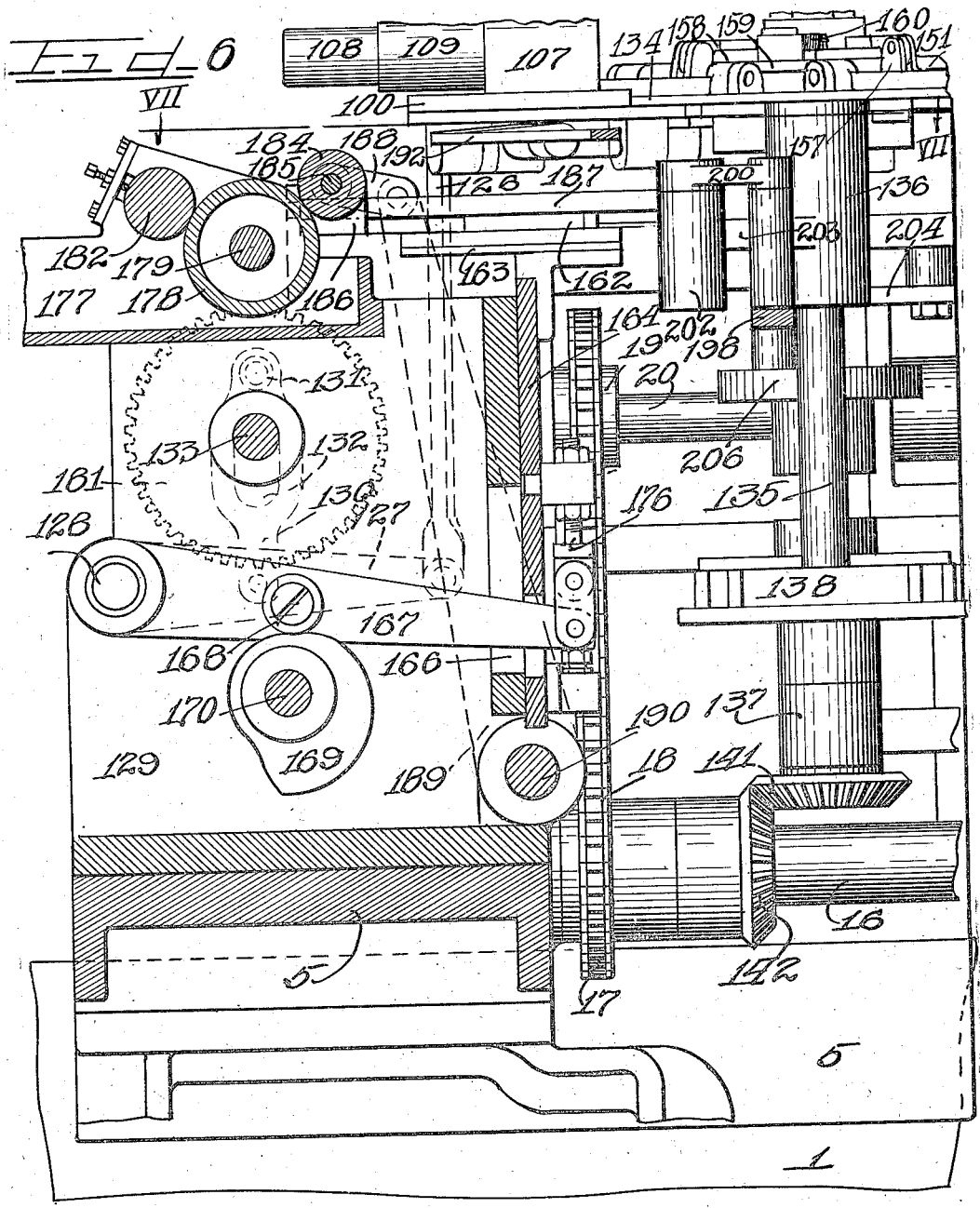

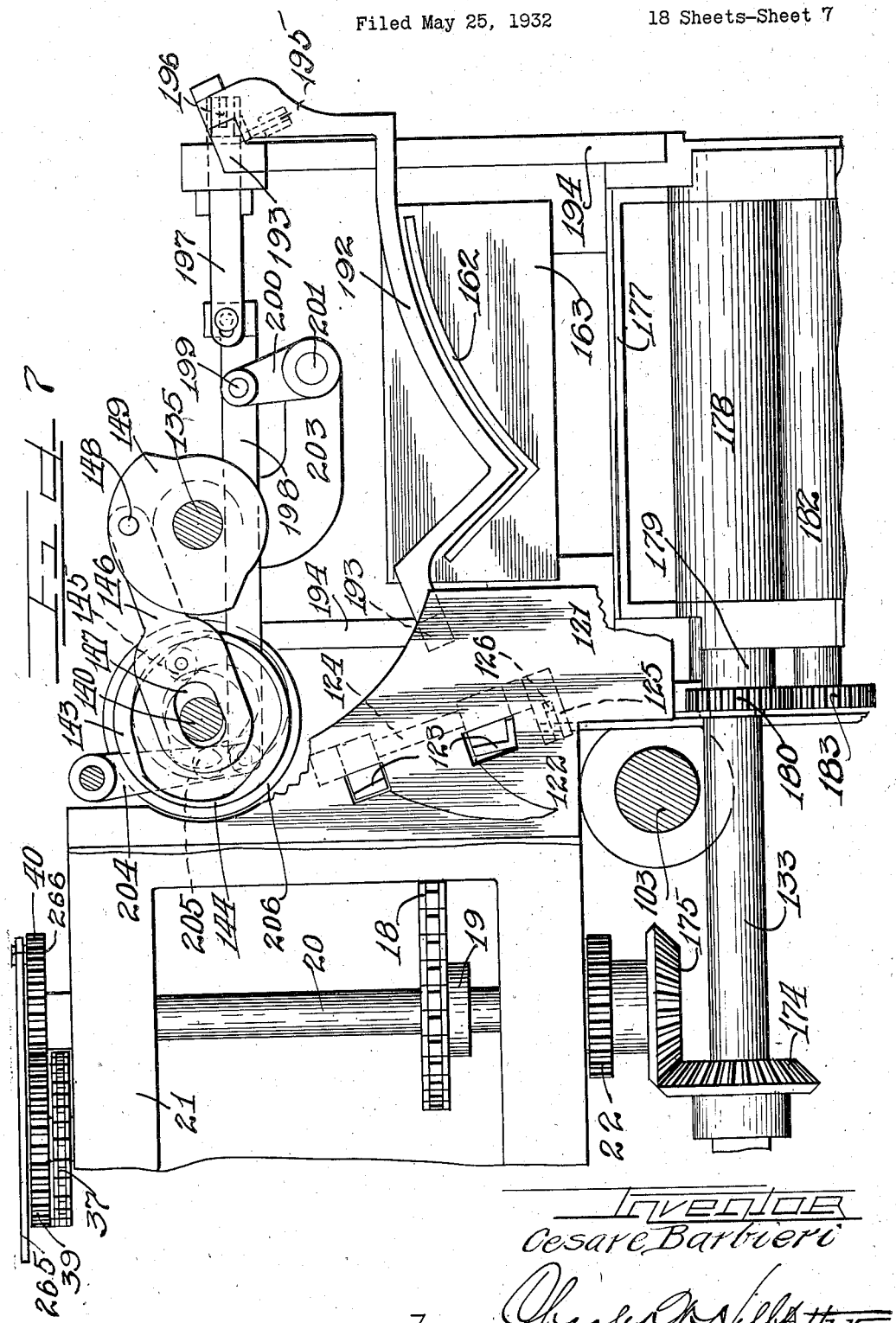

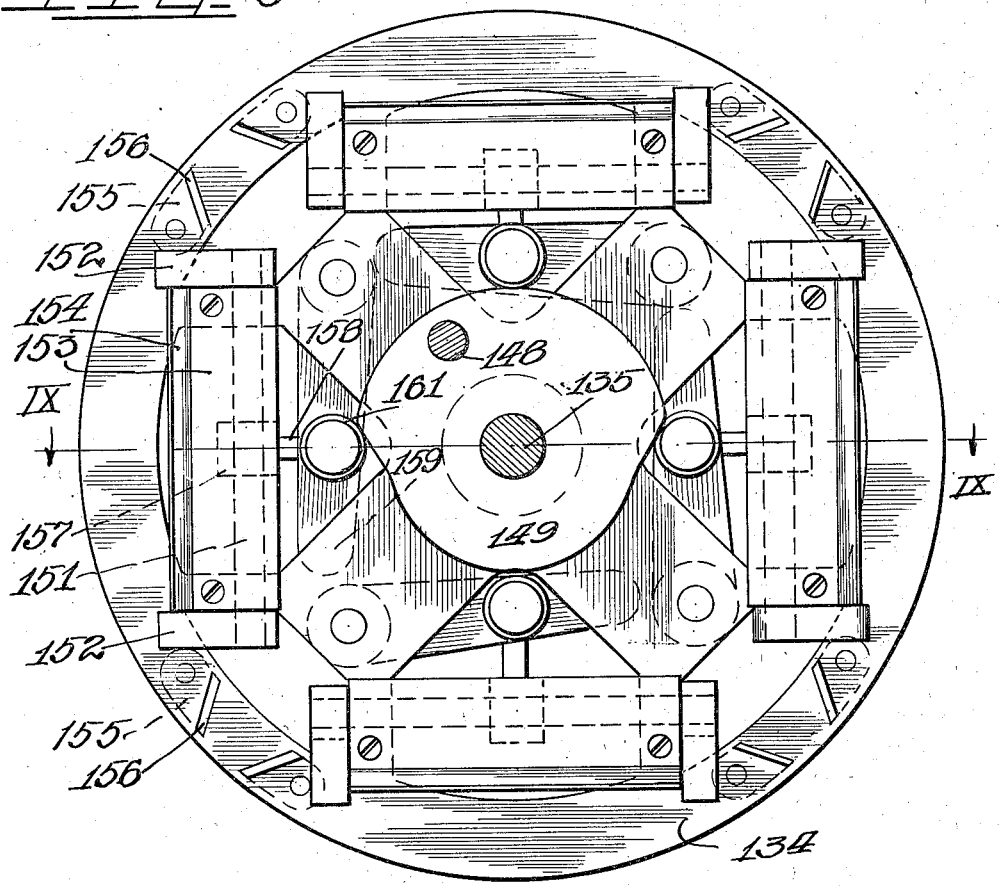
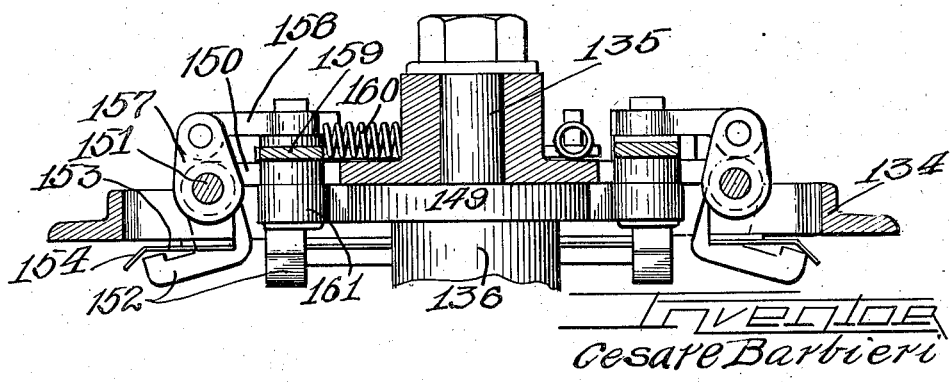

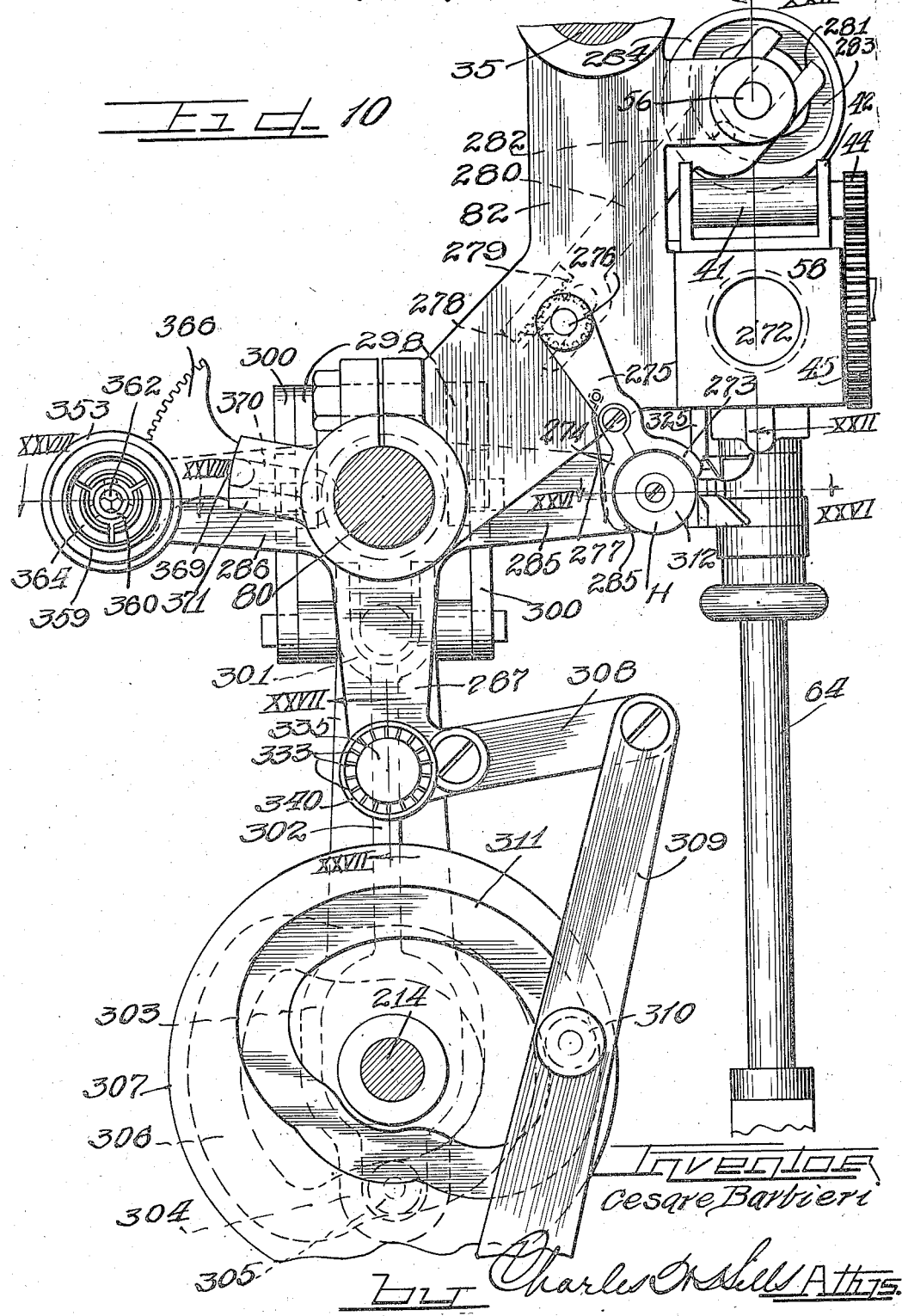

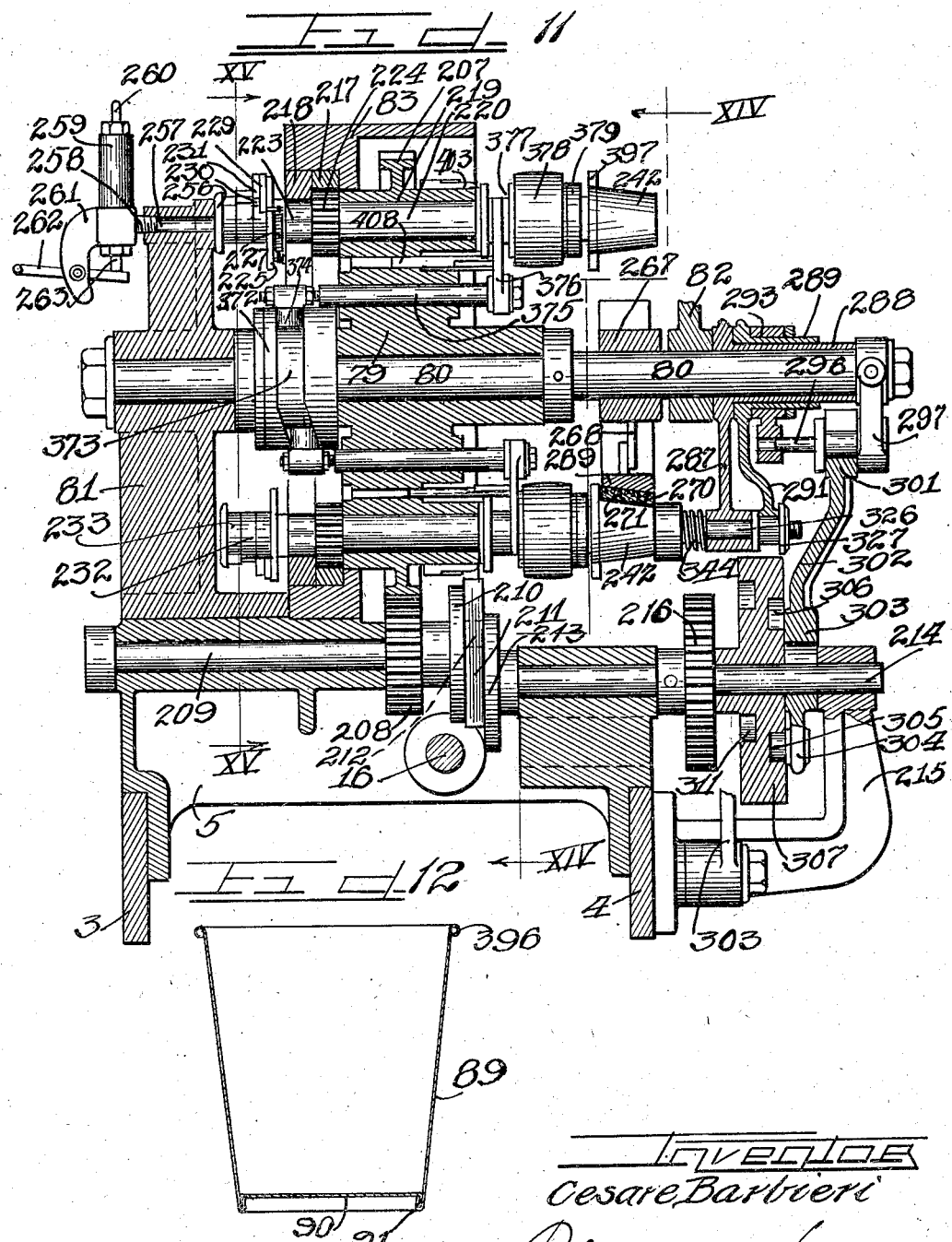

Aug. 4, 1936. C. BARBIERI 2,049,418
CUP MACHINE
Filed May 25, 1932 18 Sheets-Sheet 11
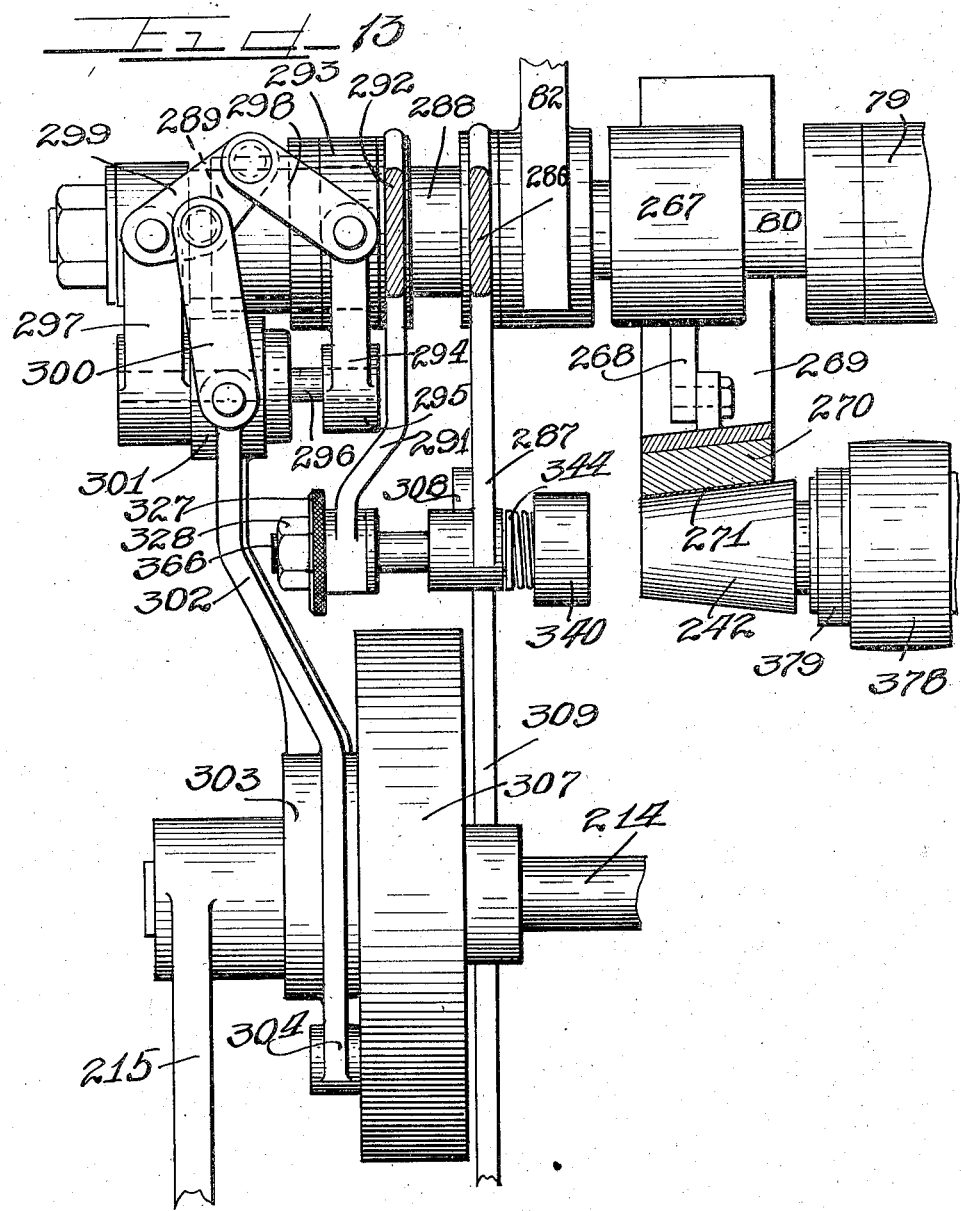
Inventor
Cesare Barbieri
by Charles M. Willcutts

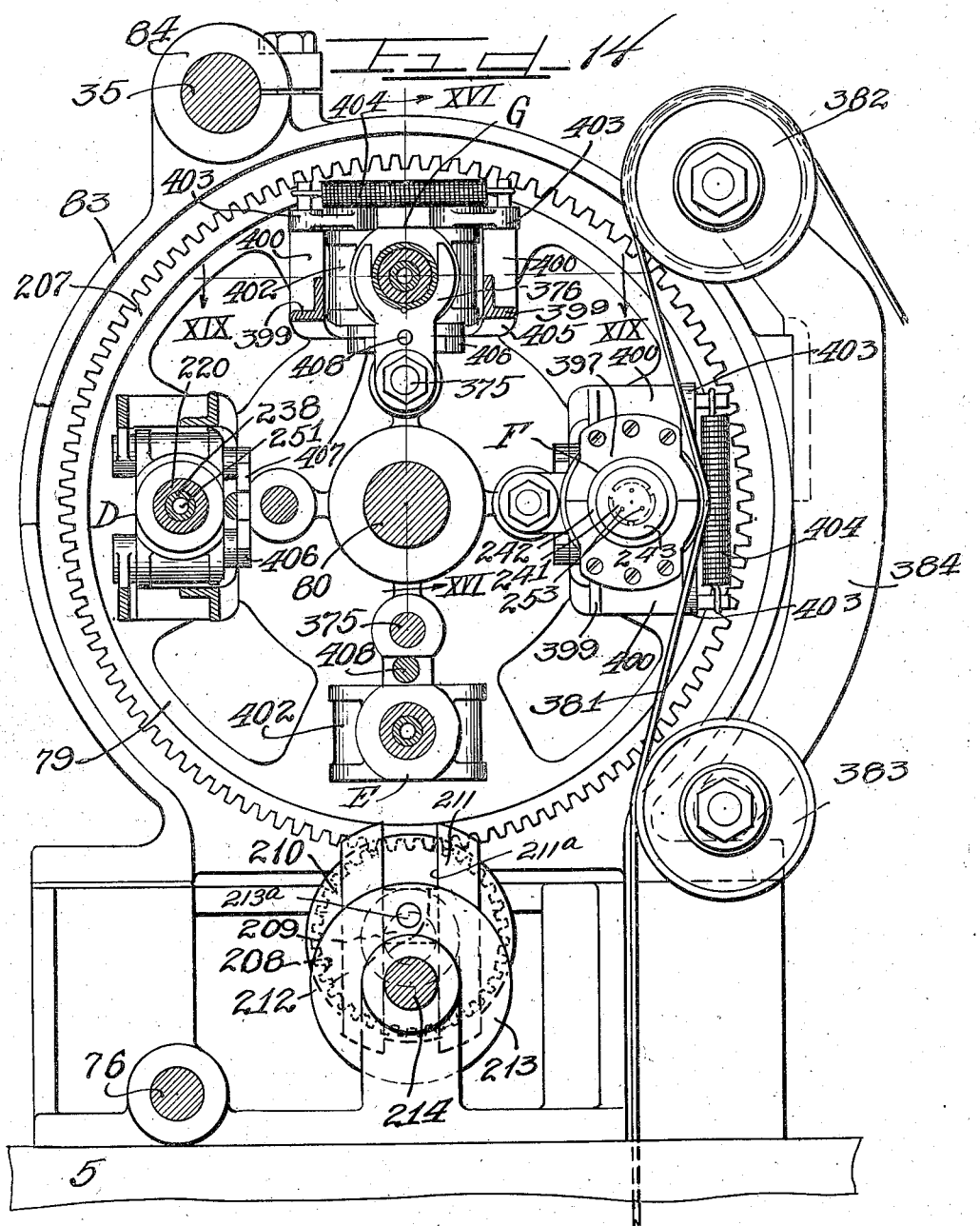

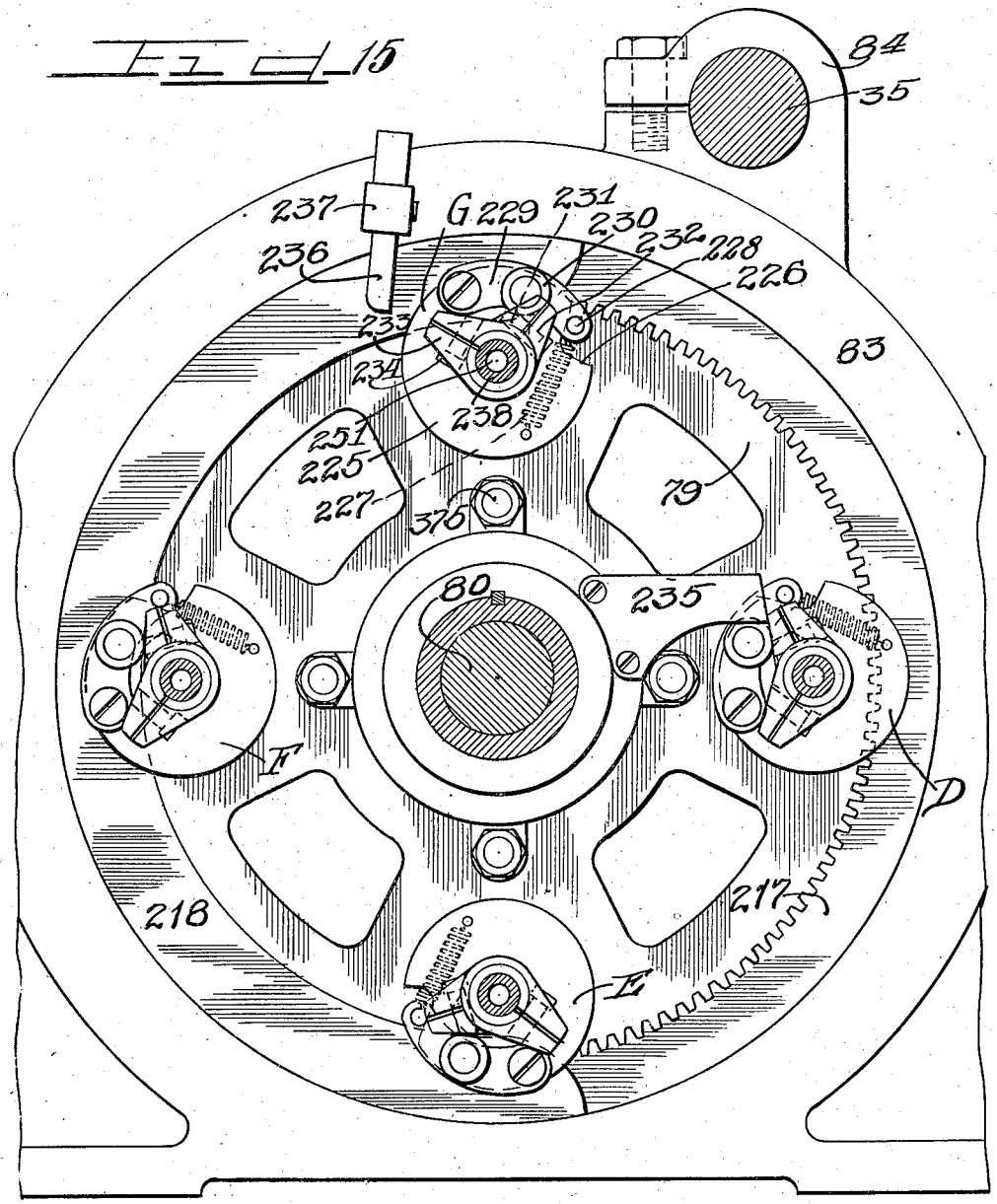

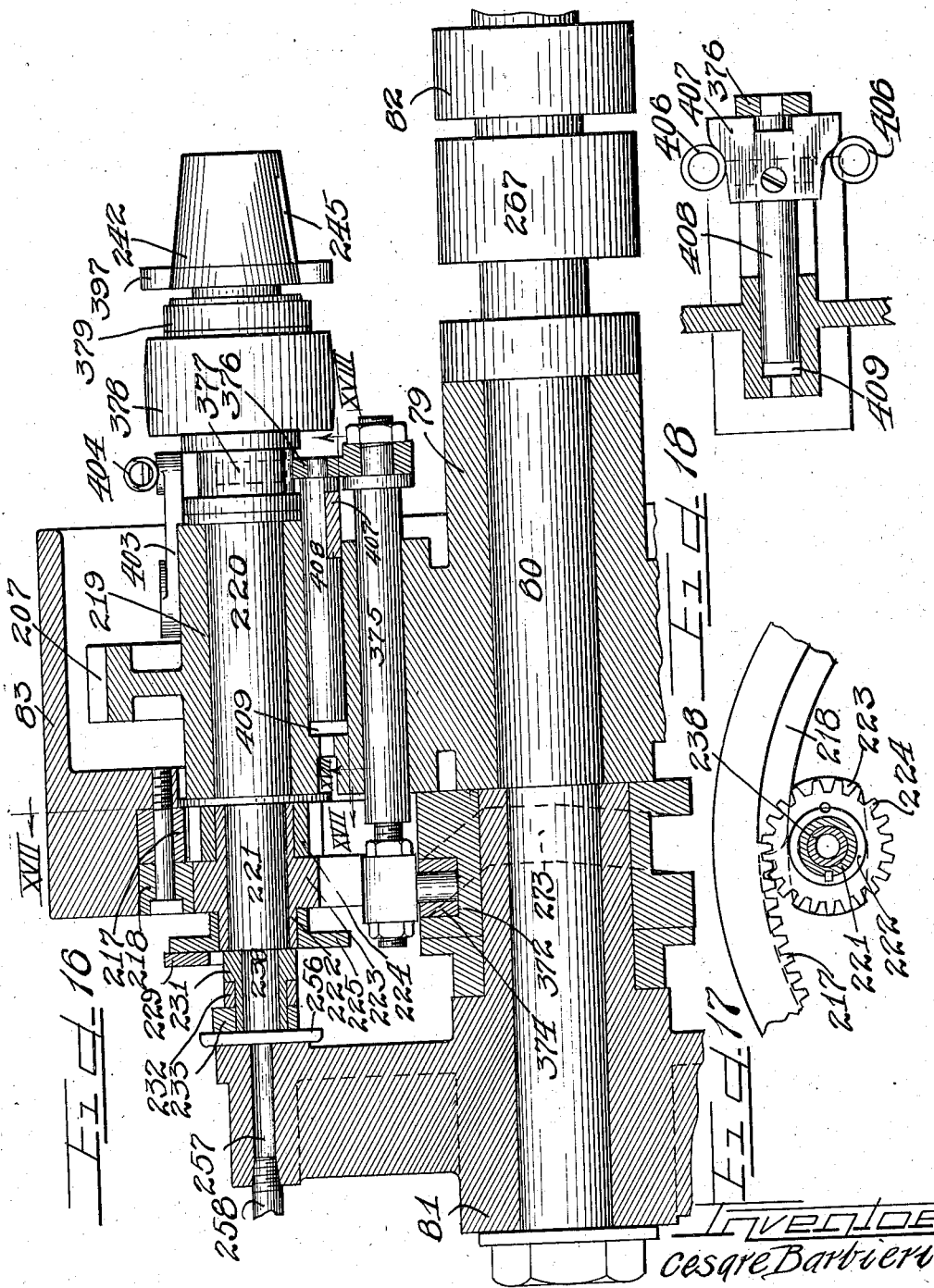

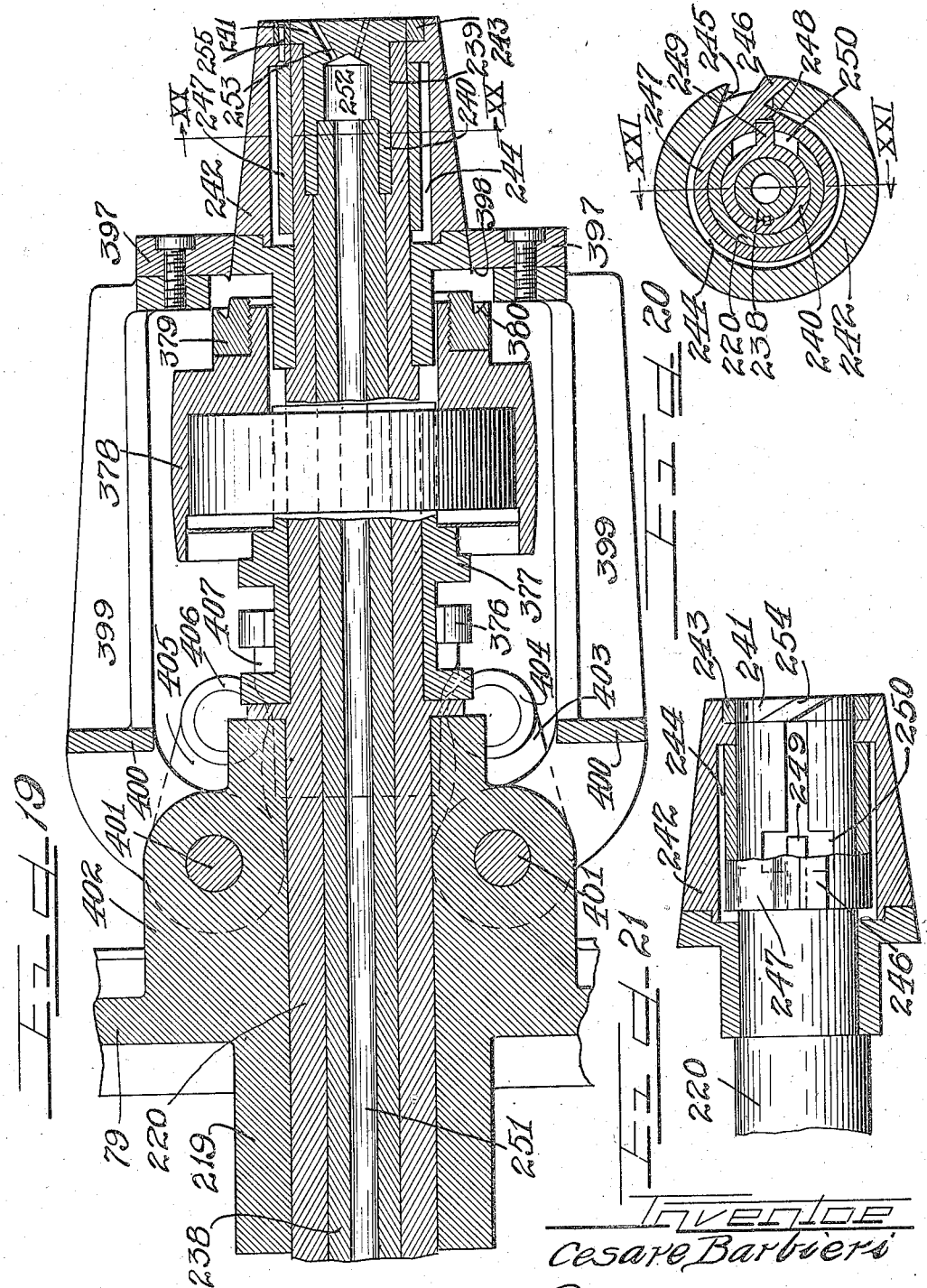

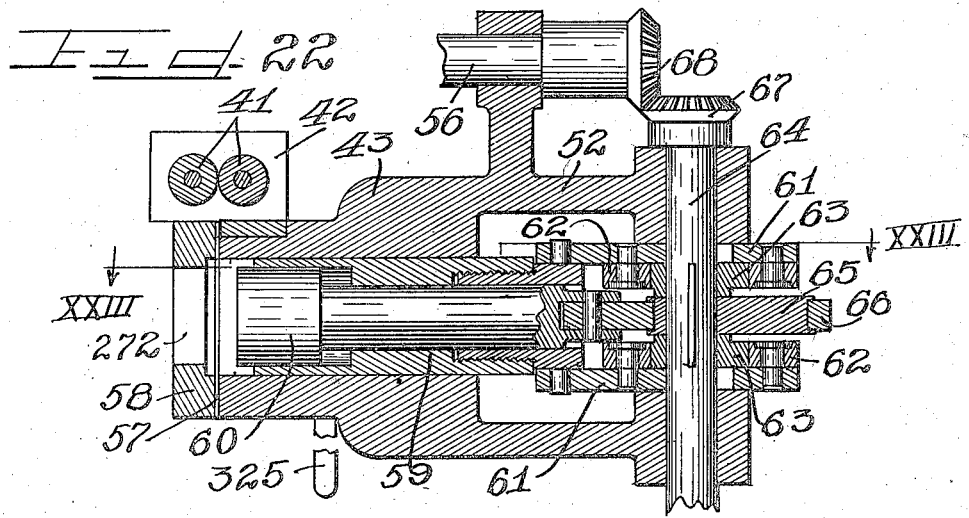
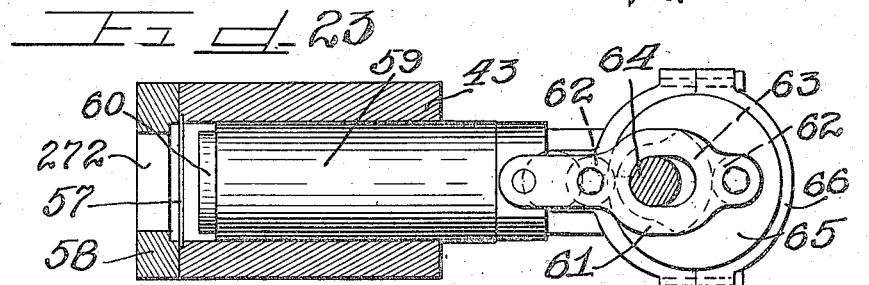
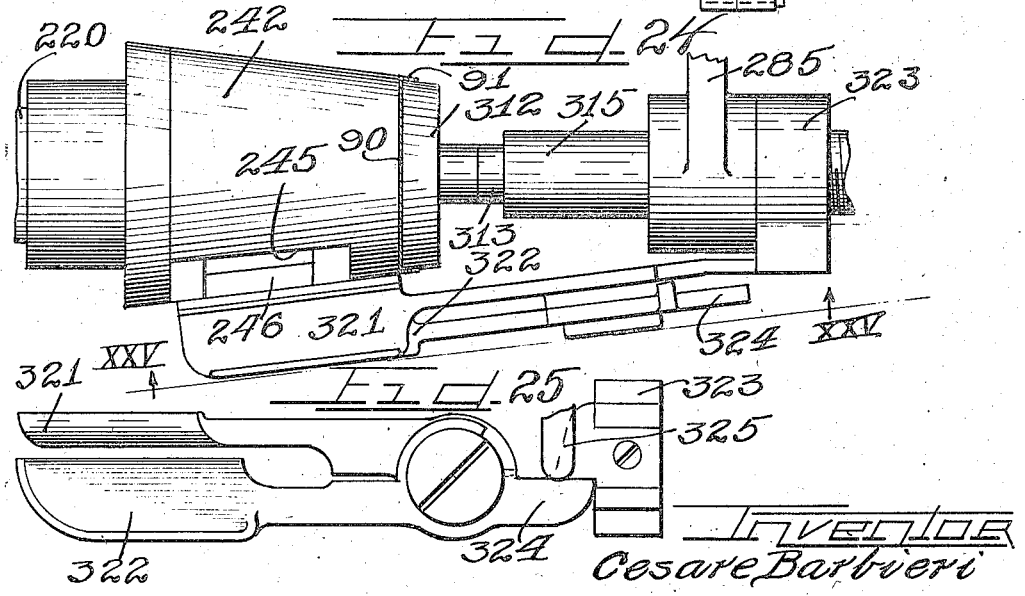

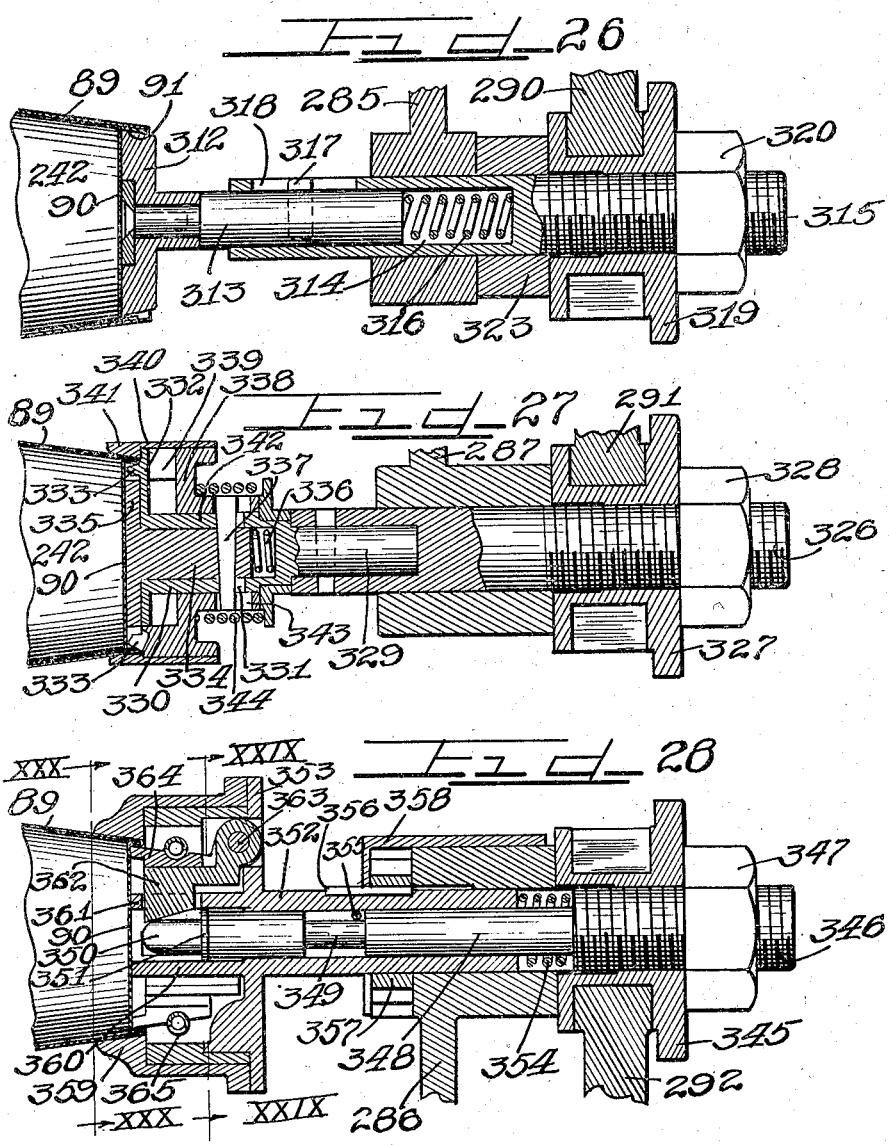

Aug. 4, 1936.                    C. BARBIERI                    2,049,418
                                 CUP MACHINE
                         Filed May 25, 1932          18 Sheets-Sheet 18
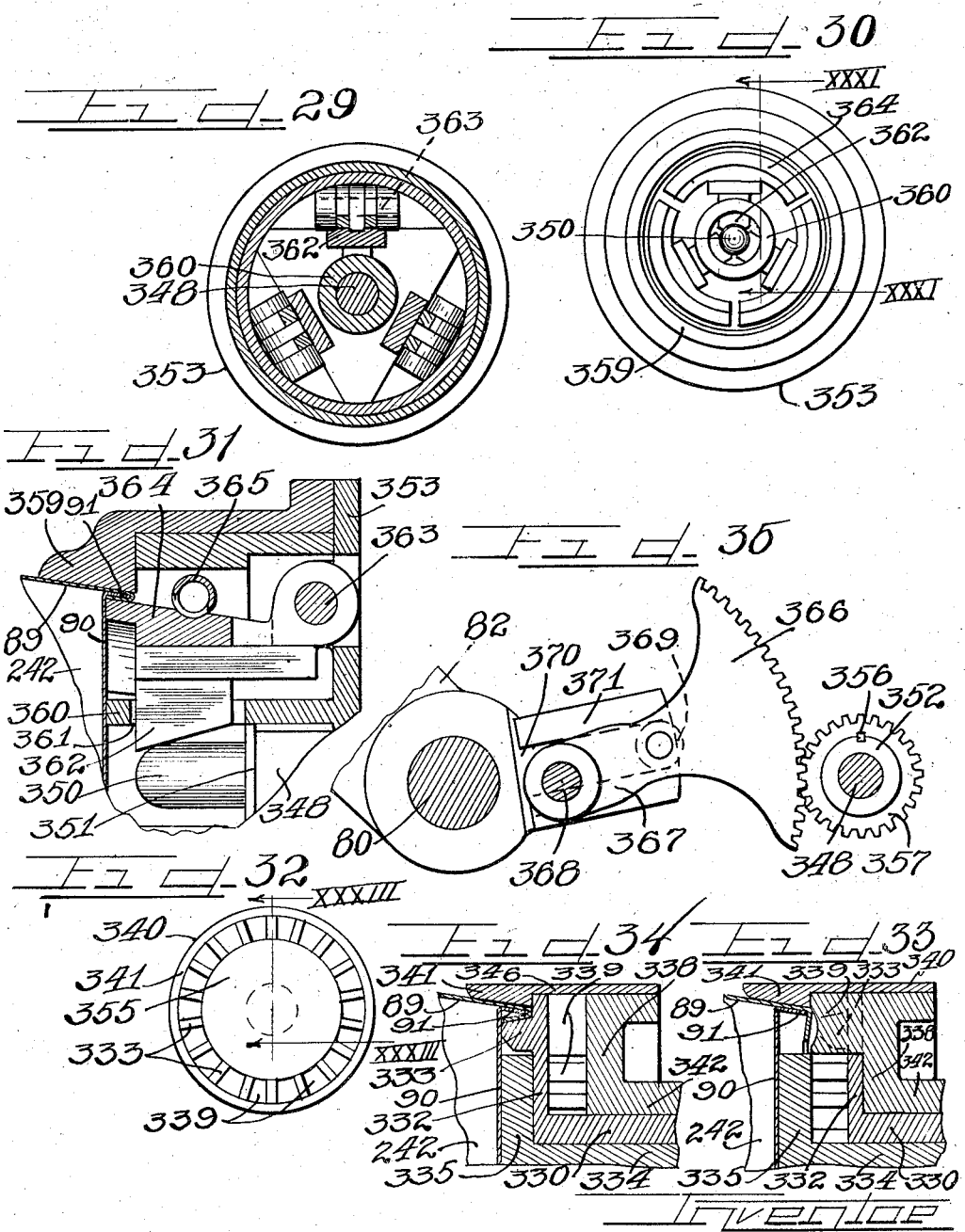

Patented Aug. 4, 1936

2,049,418

UNITED STATES PATENT OFFICE 2,049,418

CUP MACHINE

Cesare Barbieri, New York, N. Y., assignor to Vortex Cup Company, Chicago, Ill., a corporation of Delaware Application May 25, 1932, Serial No. 613,373

93 Claims. (Cl. 93—39.3)

The present invention relates to an improved type of cup making machine and more particularly to a flat bottom cup making machine for rapidly producing flat bottom paper cups from a plurality of properly shaped glued body blanks and bottom blanks which are fed through the machine by improved feeding and transfer mechanisms into the field of operation of rotary formers to be formed into flat bottom cups having rolled drinking edges or beads.

While a new and novel container and a new and novel method of making a container are shown and described herein, such are not claimed herein, but are claimed in my copending applications, entitled "Container", filed November 26, 1934, Serial No. 754,715, and "Process of making containers", filed April 26, 1934, Serial No. 722,442, respectively.

It is an object of this invention to provide an improved type of a rotary flat bottom cup making machine including a rotary type of body blank transfer and feed mechanism whereby body blanks received from a magazine are transferred to a glue applying mechanism and are then delivered into a position to be gripped by rotary formers to be formed around cup bottom blanks which are formed in the machine and are delivered against the outer flat ends of the rotary formers.

It is also an object of this invention to provide an improved type of cup making machine adapted to automatically punch out and form cup bottom blanks and also feed and glue cup body blanks, said bottom blanks and body blanks adapted to be delivered in timed relation to be applied to and gripped by rotary forming mandrels to be formed into liquid tight flat bottom cups having the upper edges or margins rolled to form drinking beads.

A further object of the invention is to provide a cup machine adapted to apply glue to a body blank, punch out and form a bottom blank and then form the body blank around the bottom blank, pressing a flange of the bottom blank between a glued bent over margin of the body blank to form a flat bottomed cup the upper margin of which is adapted to be subjected to the action of a rotatable bead forming unit adapted to roll the edge of the cup into a finished drinking bead upon completion of which the finished cup is automatically discharged from the machine.

Another object of the invention is to provide an improved type of rotary flat bottomed cup making machine having means for transferring a copy body blank from a magazine to a gluing mechanism and then to a rotary former having grippers for clamping the blank to permit the same to be formed around a flanged bottom blank to enclose the same to produce a flat bottomed cup the open margin of which is subjected to the action of a rotary edge deflecting means adapted to roll the cup edge into a drinking bead to complete the flat bottomed cup which is then automatically released and blown from the former into a cup receiving trough.

It is furthermore an object of this invention to provide an improved type of cup making machine having a mechanism operable from the machine for punching a cup bottom blank from a strip of paper and delivering the blank against one end of a forming mandrel, while a body blank is stamped with glue and is then transferred to the forming mandrel to be formed around the mandrel and crimped and glued to a flange of the bottom blank while the upper margin of the cup being formed is rolled into a drinking bead to form a completed cup which is then automatically discharged from the forming mandrel.

It is a further object of this invention to provide a cup making machine wherein a rotatable wheel carries a plurality of rotatable mandrels having presser means associated therewith, with each of said mandrels adapted when in an initial position to have a plurality of blanks fed thereto and then carried thereby consecutively through other positions whereby one of the blanks is formed around and pressed against another blank to produce a liquid tight flat bottom cup which during the formation thereof has the rim thereof deflected and rolled to form a drinking bead to complete the cup which in a final position of the mandrel is automatically released and discharged off of the mandrel into a receiver.

It is also an object of this invention to provide a cup machine having means for applying adhesive to a cup body blank carried on a rotatable transfer device, while a cup bottom blank is punched from a strip of material and is transferred through an arc into a position to be engaged by means adapted to move and hold the bottom blank against one end of a forming mandrel to be carried thereby as the adhesived body blank is formed therearound and has one longitudinal margin overlapping and glued to another longitudinal margin of the body blank after which another glued margin of the body blank is crimped around and pressed against the flange of the punched bottom blank to form a flat bottom cup the upper margin of which is deflected and curled to form a drinking bead or rim, after which the completed cup is released and automatically discharged off of the forming mandrel.

Another object of the invention is to provide an improved type of flat bottom cup making machine wherein a rotatable wheel carries a plurality of cup forming mandrels to which cup body blanks and cup bottom blanks are adapted to be applied and formed into cups with the assistance of a rocking spider carrying mechanisms to coact with the mandrels in predetermined positions of travel thereof to apply bottom blanks to the mandrels, then cause crimping of a portion of the body blanks around the flanges of the bottom blanks and then iron the crimped lower portions of the cups while the open ends of the cups are deflected and rolled by rim forming mechanisms associated with the mandrels and adapted to be rapidly rotated by belt means to complete the cups as they are advanced into a predetermined position to be discharged from the machine.

It is an important object of this invention to provide a paper cup making machine of the rotary type having a rotatable transfer mechanism for transferring cup body blanks from a magazine to a gluing device and then to a rotatable forming mechanism adapted to carry blanks to different stations to permit glued body blanks to be formed around the flanged bottom blanks with the assistance of a rocker mechanism carrying bottom blank applying means, crimping means and ironing means adapted to act on the blanks as they pass through different stations carried by the forming mechanism to cause flat bottom cups to be formed having the upper edges of said cups deflected and curled by spinning mechanism to form drinking beads on the cups as they are advanced into a position from which the completed flat bottom cups are automatically released and discharged from the forming mechanism.

Other and further important objects of this invention will be apparent from the disclosures in the specification and the accompanying drawings.

The invention (in a preferred form) is illustrated in the drawings and hereinafter more fully described.

On the drawings:

Figure 3 is an enlarged transverse vertical sectional view taken on line III—III of Figure 1 with parts omitted.

Figure 4 is an enlarged transverse detail sectional view taken on line IV—IV of Figure 1 with parts omitted.

Figure 5 is an enlarged fragmentary top plan view of the body blank feed, transfer and gluing units of the machine taken on line V—V of Figure 1 with parts omitted.

Figure 6 is a fragmentary vertical sectional view taken on line VI—VI of Figure 5.

Figure 7 is a fragmentary horizontal detail sectional view taken on line VII—VII of Figure 6 with parts omitted.

Figure 8 is an enlarged bottom plan view of the rotatable body blank transfer wheel unit.

Figure 9 is a transverse sectional view of the body blank transfer wheel unit taken on line IX—IX of Figure 8 with parts shown in elevation.

Figure 10 is an enlarged fragmentary vertical section taken on line X—X of Figure 3 illustrating the mechanisms for transferring the cup bottom blanks from the punching unit into a position to be applied to a forming mandrel, and also illustrating the rocker spider which carries the bottom blank applying unit, the crimping unit and the cup ironing unit.

Figure 11 illustrates an enlarged transverse vertical section of the machine taken on line XI—XI of Figure 1, with parts shown in elevation.

Figure 12 illustrates a vertical central section taken through a flat bottom cup reduced by the machine.

Figure 13 is an enlarged fragmentary detail vertical sectional view taken on line XIII—XIII of Figure 1 with parts omitted.

Figure 14 is a vertical sectional view taken on line XIV—XIV of Figure 11 illustrating the front side of the mandrel carrying turret wheel omitting different portions of different mandrel units to bring out detailed features.

Figure 15 is an enlarged vertical sectional view taken on line XV—XV of Figure 11 illustrating the rear side of the mandrel carrying turret wheel.

Figure 16 is an enlarged fragmentary vertical detail section taken on line XVI—XVI of Figure 14 with parts shown in elevation illustrating the detailed parts of one of the mandrel units.

Figure 17 is a fragmentary detail section taken on line XVII—XVII of Figure 16.

Figure 18 is a fragmentary detail sectional view taken on line XVIII—XVIII of Figure 16.

Figure 19 is an enlarged fragmentary detailed section of one of the mandrel units taken on line XIX—XIX of Figure 14 with parts shown in elevation.

Figure 20 is a transverse detail section of a forming mandrel unit taken on line XX—XX of Figure 19.

Figure 21 is a fragmentary sectional view of the mandrel unit taken on line XXI—XXI of Figure 20.

Figure 22 is a fragmentary detail sectional view taken on line XXII—XXII of Figure 10 illustrating the detailed parts of the bottom blank punch unit.

Figure 23 is a fragmentary detail sectional view taken on line XXIII—XXIII of Figure 22.

Figure 24 is a fragmentary enlarged detail view taken on line XXIV—XXIV of Figure 3 illustrating the guide means for directing a cup body blank to the gripping means of a forming mandrel.

Figure 25 is a detail elevational view of the body blank guide means taken on line XXV—XXV of Figure 24.

Figure 26 is an enlarged fragmentary detail sectional view taken on line XXVI—XXVI of Figure 10 with parts in elevation and illustrating the means for delivering cup bottom blanks against the ends of the forming mandrels.

Figure 27 is an enlarged fragmentary detail sectional view taken on line XXVII—XXVII of Figure 10 with parts in elevation and illustrating the crimping mechanism for deflecting and crimping the lower ends of cups around the flanges of the cup bottom blanks.

Figure 28 is an enlarged fragmentary sectional view with parts in elevation taken on line XXVIII—XXVIII of Figure 10 and illustrating the ironing mechanism for ironing or pressing the crimped or folded lower portion of the cup.

Figure 29 is a transverse detail section of the crimping head taken on line XXIX—XXIX of Figure 28.

Figure 30 is an end view of the crimping head taken on line XXX—XXX of Figure 28.

Figure 31 is an enlarged fragmentary detail section of the crimping head taken on line XXXI—XXXI of Figure 30.

Figure 32 is an end view of the deflecting and crimping head of the crimping mechanism illustrated in Figure 27.

Figure 33 is an enlarged fragmentary detail section of the deflecting and crimping head taken on line XXXIII—XXXIII of Figure 32 showing the lower margin of a cup partly deflected.

Figure 34 is a fragmentary sectional view similar to that illustrated in Figure 33 showing the completing operation for bending a margin of the cup body around the flange of a bottom blank.

Figure 35 is an enlarged detail view of the means for spinning or rapidly rotating the pressing or ironing head of the ironing unit illustrated in Figure 28.

As shown on the drawings:

Figure 1:
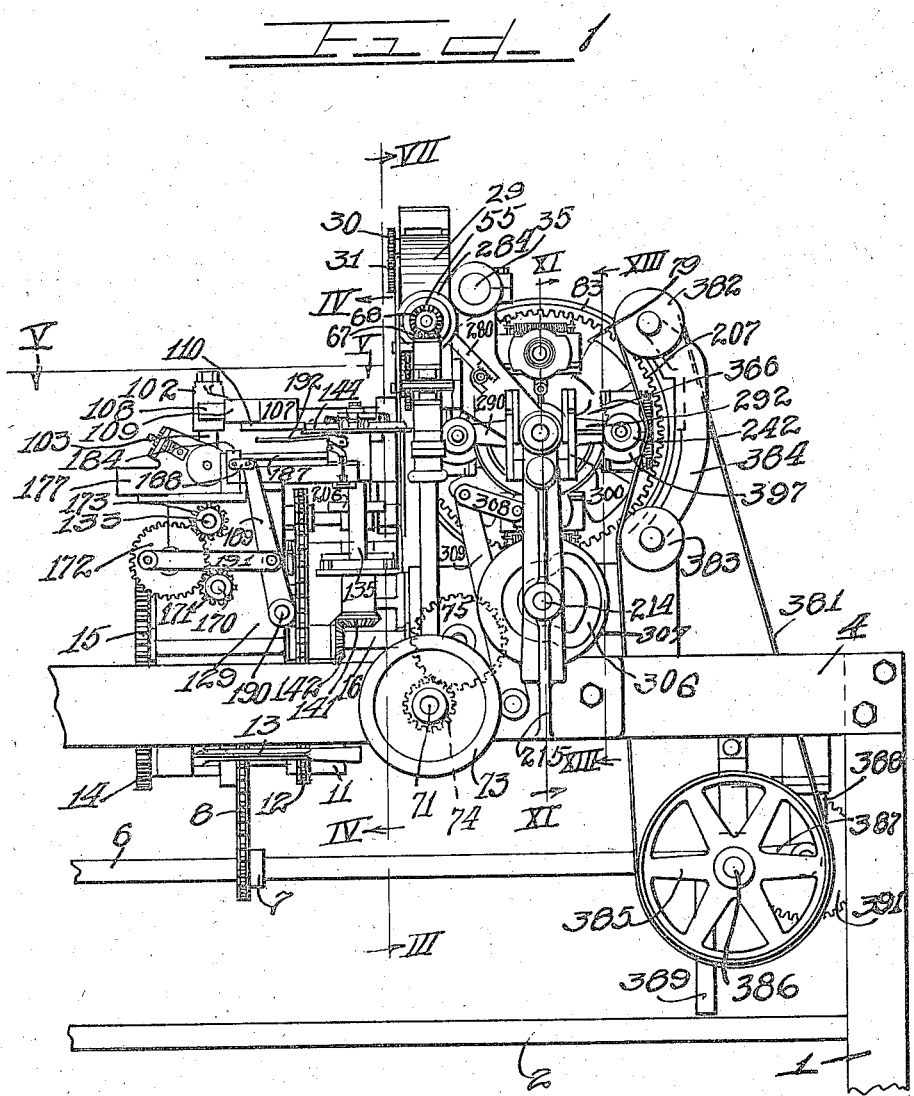
Figure 1 is a front elevation of a cup machine embodying the principles of this invention.

The improved cup machine of this invention is primarily adapted for the manufacture of flat bottom cups having rolled or curled drinking bead edges. The machine embraces a plurality of coacting mechanisms adapted to feed a strip of material through a cup bottom blank punch device to punch out and form a bottom blank with a bent over flange; to transfer the flanged bottom from the punch mechanism into a position to be engaged by a feed mechanism carried by a rocking spider whereby the flanged bottom blank is applied against the end of a forming mandrel carried by a rotatable turret wheel; to feed a sector shaped cup body blank from a magazine to a rotatable transfer wheel to be carried thereby through the field of operation of an adhesive applying device to cause stripes of adhesive to be applied to the body blank without necessitating the removal thereof from the transfer wheel; to deflect the adhesived blank as it is being transferred by the transfer wheel to protect the stripe of adhesive as the stamped body blank is delivered through guide means into engagement with grippers carried by the mandrel to cause the body blank as it is released from the transfer wheel to be gripped to the mandrel to cause the body blank to be wound or shaped around the mandrel and around the flanged bottom blank engaged against the end thereof; to carry the partly formed cup blank by means of the turret wheel into another position wherein deflecting and crimping mechanisms carried by the rocking spider act in timed relation to cause an adhesived margin of the body blank to be deflected and bent around the flange of the bottom blank and be pressed thereagainst to hold the bottom blank securely gripped by the body blank; to cause the partly formed flat bottom cup to be carried by the turret wheel into another position to be acted upon by an ironing mechanism carried by the rocking spider to cause the interfitting portions of the bottom blank and body blank to be thoroughly pressed and ironed to complete the bottom end of a cup while the upper margin of the cup is acted upon by a rotatable and a reciprocating curling mechanism which deflects and curls the upper margin of the cup with a spinning action to cause a rolled drinking bead to complete the cup; to effect a further conveyance of the formed cup by the turret wheel and the mandrel into a position wherein the grippers release the formed cup and wherein pneumatic means are automatically brought into operation to cause the released cup to be blown or discharged from the machine into a suitable receiver.

The improved machine constructed for the purpose of manufacturing flat bottom paper cups comprises a plurality of coacting associated devices which are supported upon a suitable support comprising end frames 1 having their lower portions connected by means of connecting bars or rods 2. The upper portions of the end frames 1 are connected by means of side beams or sills 3 and 4 on which a top frame or table casting 5 is mounted. It will be conducive to a clearer understanding of the operation of the machine to describe at this point the character and arrangement of the main driving mechanism. A horizontal main drive shaft 6 is journalled in suitable bearings provided in the end frames 1 and said shaft is adapted to be connected to receive a drive from any suitable source of power. Secured on the driving shaft 6 is a sprocket wheel 7 around which an endless driving chain 8 is engaged. The chain 8 is also engaged around an upper sprocket wheel 9 (Figure 4) which is fixed on a stub shaft 10 journalled in a bracket 11 secured on the under side of the top frame or casting 5. Also mounted on the stub shaft 10 is a control clutch 12 which is operable by means of a control handle 13 for operating the clutch to cause either starting or stopping of the machine. Secured on one end of the stub shaft 10 is a driving gear 14 which meshes with and drives a large driving gear 15. The large gear 15 is secured on the outer end of a shaft 16 which is journalled in suitable bearings provided in the top frame 5. Also secured on the stub shaft 16 is a sprocket wheel 17 (Figure 4) around which an upper driving chain 18 is engaged. The upper chain 18 is also engaged around a sprocket wheel 19 secured on an upper shaft 20 which is journaled in suitable bearings provided in an upper frame casting 21 which in turn is supported upon the top framework casting 5. The driving shaft 20 has secured thereon a gear 22 for transmitting a drive to the cup body blank feed unit which will hereinafter be more fully described.

Forming part of the machine are mechanisms for feeding a strip of material to a bottom blank punching and forming mechanism and these feeding and punching units will now be described. Mounted on the framework sill 3 is a rearwardly extending bracket 23 (Figure 2) on which a reel of paper 24 is rotatably supported. A strip of paper 25 is adapted to be unreeled from the reel 24 and passes beneath a roller 26 carried by a pivoted bracket 27 supported by arms 28 mounted on the bracket 23. The strip of paper 25 passes upwardly between two side members of the pivoted arm 27 to guide the strip of material as it passes upwardly through a guide chute 29 between suitable feed rollers the lower one of which is driven by means of a gear 30 secured on one projecting end of the lower roller shaft as illustrated in Figure 3.

Meshing with the gear 30 is a driving gear 31 which is supported on a stub shaft 32 on which a sprocket wheel 33 is also supported. The stub shaft 32 is supported in a casting or block 34 mounted on a supporting shaft 35. Engaged on the sprocket wheel 33 is a driving chain 36 the lower bight portion of which is engaged around a sprocket wheel 37 mounted on a stub shaft 38 supported in one side of the framework casting 21. Also mounted on the stub shaft 38 is a gear 39 which meshes with and receives a drive from a gear 40 mounted on one projecting end of the shaft 20 as clearly illustrated in Figure 7.

From the guide chute 29 the strip of paper 25 is guided downwardly into the machine between a pair of feed rollers 41 which are rotatably mounted in a box or casting 42 supported upon a punch housing 43. Mounted on the projecting ends of the shafts of the rollers 41 are meshing gears 44. One of the gears 44 meshes with and receives a drive from a larger gear 45 which is supported on a stub shaft 46 projecting from one side of the punch housing 43 as illustrated in Figures 3 and 10. Also mounted on the stub shaft 46 is a ratchet wheel 47 with which a pawl 48 coacts. The pawl 48 is pivotally carried on one end of a bell crank 49 which is fulcrumed on the stub shaft 46 as clearly illustrated in Figure 3. Pivotally connected to the lower end of the bell crank 49 is one end of a connecting link 50 the opposite end of which is pivotally connected to the lower end of fulcrumed lever 51 which is pivotally supported intermediate its ends on a bracket arm 52 forming part of the punch housing 43. A pin 53 is carried by the upper end of the fulcrumed lever 51 and said pin projects into a cam slot 54 formed in a cam roller 55 keyed or otherwise secured on a shaft 56 which is journalled in suitable bracket arms supported on the punch housing 43.

From the feed rollers 41 the strip of paper 25 passes downwardly through a slot 57 (Figure 22) provided between the end of the punch housing 43 and the inner end of a die head 58 secured on the punch housing. Slidably mounted in the punch housing 43 is a bottom blank punch sleeve 59 for coaction with the die head 58. Slidably projecting through the punch sleeve 59 is a bottom blank forming plunger 60 which is adapted to be projected through the die head 58 to cause a bottom blank to be punched out by means of the punch sleeve 59 to be forced through the die head opening to cause the bottom blank to be formed with a peripheral flange. The bottom blank punch sleeve 59 has connected to the inner end thereof a pair of eccentric arms 61 which carry rollers 62 on the inner side thereof with said rollers coacting with the peripheries of a pair of control cams 63 which are keyed upon a vertical driving shaft 64. Also mounted on the shaft 64 between the control cam 63 is an eccentric disc 65 which is mounted within an eccentric ring 66 having an extension which is pivotally connected with the stem of the bottom blank forming plunger 60. Secured on the upper end of the vertical driving shaft 64 is a beveled gear 67 which is in mesh with and drives a beveled gear 68 secured on one end of the horizontal shaft 56 to drive the same.

A beveled gear 69 is secured on the lower end of the vertical shaft 64 and receives a drive from a beveled gear 70. The beveled gear 70 is mounted on the outer end of a stub shaft 71 which is journaled in a bearing bracket 72 secured to the framework sill 4. Secured on the outer end of the stub shaft 71 is a hand wheel 73 adapted for manual rotation of the shaft 71 when the machine is stopped. Secured on the inner end of the stub shaft 71 is a gear 74 which meshes with and receives a drive from a gear 75 secured on one end of a shaft 76 journaled in suitable bearings provided in the top framework 5 as illustrated in Figure 3. Secured on the inner end of the shaft 76 is a beveled gear 77 which is in mesh with and receives a drive from the bevel gear 78 keyed on the shaft 16.

The various operations of forming flat bottomed cups are focused about a turret wheel 79 rotatable on a shaft 80 supported at one end in a pedestal bracket 81 mounted upon the top frame 5 as illustrated in Figure 11. The turret wheel shaft 80 is also supported in the lower end of an auxiliary bracket 82 the upper end of which is supported on the upper horizontal shaft 35 as illustrated in Figures 3 and 10. The turret wheel 79 is rotatably mounted within a turret wheel housing 83 having clamping brackets 84 formed on the upper portion thereof in which the shaft 35 is supported. The turret wheel housing 83 is supported on the top frame 5 as clearly illustrated in Figure 3.

Figure 36:
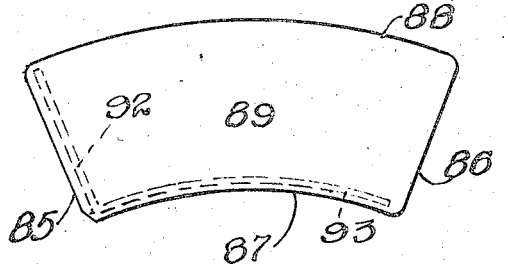
Figure 36 is a developed plan view of a cup body blank.
Figure 37:
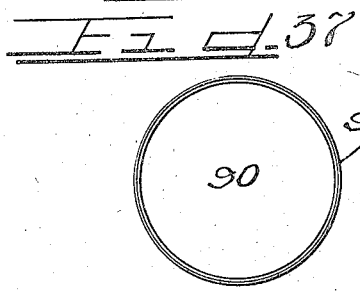
Figure 37 is a top plan view of a cup bottom.

In the present form of the machine the same is adapted to produce flat bottom cups with curled beads forming the drinking edges. It will of course be understood that the machine may be adapted for making cups or containers of different shapes and sizes. The cup body blanks used in the cup making machine are preferably constructed of prepared paper or the like and each blank is of segmental shape as illustrated in Figure 36 having two straight inclined edges 85 and 86 joined by two arc shaped edges 87 and 88. The blank as a whole is designated by the reference numeral 89. Each bottom blank as illustrated in Figure 37 consists of a circular blank 90 the margin of which is deflected to form a flange 30 or rim 91. Each of the cup body blanks 89 during its travel through the machine is adapted to have a straight stripe of adhesive material or glue 92 applied to one surface of the blank adjacent the straight edge 85 and an arcuate or curved stripe 93 of adhesive material or glue applied on the same surface of the blank adjacent to the lower curved or arc shaped edge 87 as clearly illustrated in Figure 36. The shapes of the adhesive stripes applied to one surface of the cup body blank are determined by the shape of a glue stamping pad hereinafter described.

The cup body blank feed unit will now be described. A stack of paper cup body blanks 89 shaped as illustrated in Figure 36 is deposited in a blank holding magazine comprising a base plate 94 which is secured upon a supporting frame 95 which in turn is supported upon the framework casting 21 as clearly illustrated in Figure 4. The magazine base plate 94 is provided with an opening 96 and an open rim 97 having blank guide posts 98 secured thereto for the purpose of holding and guiding a stack of cup body blanks downwardly in the magazine into a feeding position. The stack of cup body blanks is supported upon a pair of supporting arms 99 which project into the opening 96 (Figure 5) and are secured to a rocker shaft beneath the plate 94 thereby affording an arrangement permitting the stack of blanks to be raised out of feeding position when the supporting arms 99 are swung upwardly.

The movement of the blank supporting arms 99 is controlled by the movement of a blank heater 100 which is pivotally mounted at one end on a supporting bracket arm 101 which is integrally formed on a sleeve or collar 102 supported on an upright post 103. Secured on one end of the heater stub shaft engaged in the bracket 101 is a cam 104 (Figure 5) which coacts with one end of an actuating bar 105 the opposite end of which is pivotally connected to the upper end of a crank arm 106 the lower end of which is secured on one projecting end of the rocker shaft on which the blank supporting arms 99 are supported.

For the purpose of holding the heater in a stationary operating position a passaged boss or sleeve 107 is formed on the top of the heater 100 and normally receives one end of a retaining bolt 108. The retaining bolt 108 is slidably mounted in a bearing collar 109 formed on one end of a stationary bracket 10 which is integrally formed on the bracket sleeve 102.

The stack of blanks in the magazine in addition to being supported on the supporting arms 99 are supported on a blank feed device comprising a feed shaft 111 journaled in bearings formed on the magazine supporting casting 95. Supported on the feed shaft 111 are a plurality of spaced discs 112 between which a pair of diametrically opposite blank feed friction blocks or pads 113 are mounted with the pads having portions thereof projecting to engage the lowermost cup body blank in the magazine at each half revolution of the shaft 111.

Fixed on one projecting end of the body blank feed shaft 111 is a gear 114 which is in mesh with an intermediate gear 115 which in turn is in mesh with and receives a drive from the gear 22 on shaft 20.

Figure 2:
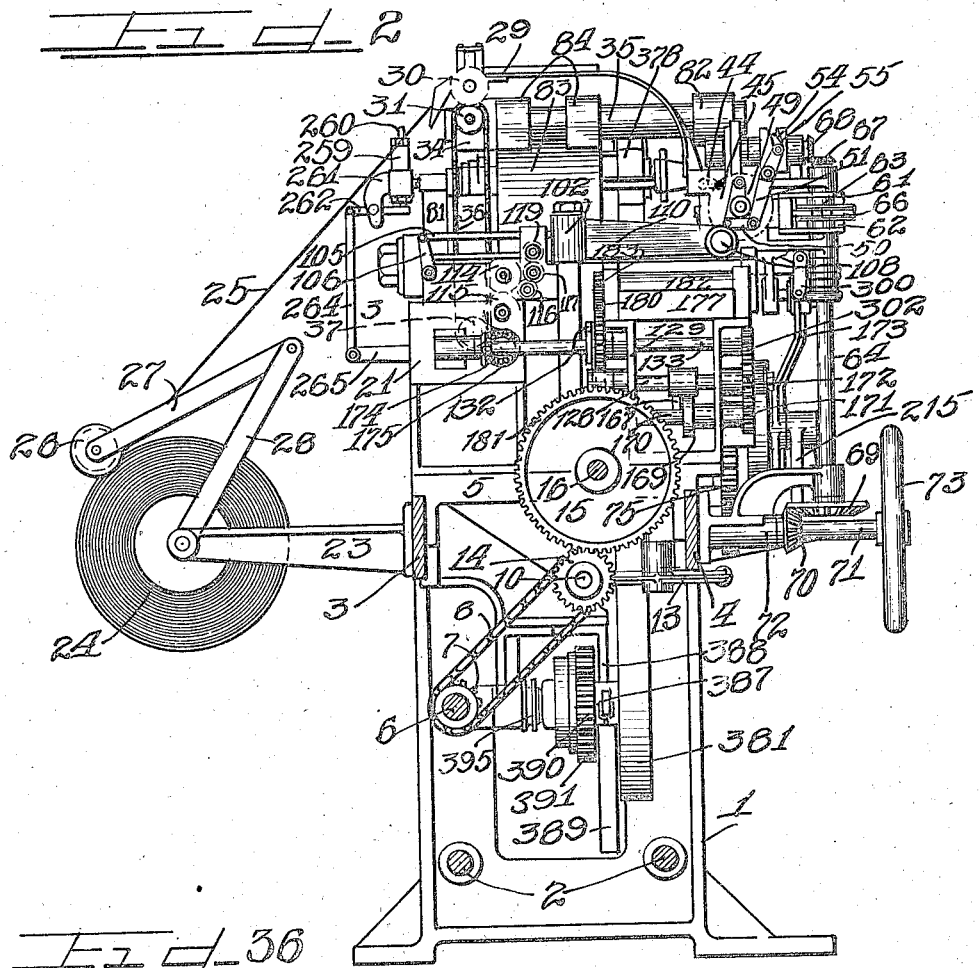
Figure 2 is an end elevation of the cup machine.

Meshing with the gear 114 to receive a drive therefrom is a small intermediate gear 116 (Figure 2). The intermediate gear 116 drives a gear 117 which is keyed on one end of a lower blank feed roller 118. Meshing with the lower blank feed roller gear 117 is an upper blank feed roller gear 119 which is secured on one end of an upper blank feed roller 120 supported in the magazine framework above the roller 118.

The lowermost cup body blank 89 in the magazine is adapted to be removed from the bottom of the stack by means of the feed pads 113 and the removed blank is fed between the feed rollers 118 and 120 which serve to advance the blank upon a blank receiving table 121 (Figures 5 and 7) over blank advancing and centering means.

The blank supporting table 121 is provided with openings 122 through which a pair of blank centering and pushing fingers 123 project to engage against the rear or bottom edge 87 of a cup body blank to center the blank and push the same off of the table 121 into engagement with a rotatable blank transfer mechanism. The blank centering and pushing fingers 123 have the lower ends thereof supported on a rocker shaft 124 supported in suitable bearings beneath the table 121. Connected to one end of the rocker shaft 124 is a crank arm 125 to which the upper end of a connecting bar 126 is pivotally connected. The lower end of the connecting bar 126 is pivotally connected to one end of a lever 127 which is pivotally supported on a stub shaft 128 which in turn is supported on a framework section 129. Connected to the lever 127 is the lower end of an arm 130 having mounted on one side thereof a roller 131 which tracks on the periphery of a control cam 132 mounted on a shaft 133 which is journaled in suitable bearings provided in the framework section 129 as clearly illustrated in Figure 6.

A cup body blank transfer mechanism is provided for receiving cup body blanks from the magazine feed rollers 118 and 120 and from the pusher fingers 123 which engage behind a cup body blank advanced to the table 121 and serve to push the cup body blank into a position to be engaged and carried away by the blank transfer mechanism. The blank transfer mechanism comprises a wheel 134 which is mounted horizontally upon the upper end of a vertical shaft 135 which is journaled in suitable bearings 136 and 137 formed on the ends of bracket arms forming a part of the machine framework. Secured on the lower portion of the shaft 135 is a Geneva gear 138 which is adapted to be intermittently rotated by a roller carried by a disc 139 secured on a vertical transfer mechanism driving shaft 140. The shaft 140 is journaled in suitable bearings forming part of the machine framework. Secured on the lower end of the shaft 140 is a bevel gear 141 which meshes with and receives a drive from a bevel gear 142 secured on the driving shaft 16.

Secured on the upper end of the shaft 140 is a control cam 143 having a cam groove 144 in the upper surface thereof (Figure 7) in which a roller 145 tracks. The roller 145 is rotatably supported on the underside of an eccentric arm 146 having a slot 147 in one end thereof into which the upper end of the shaft 140 projects. The opposite end of the eccentric arm 146 is pivotally connected to an eccentric pin 148 which projects from the underside of a gripper mechanism control cam 149 secured on the transfer wheel shaft 135 directly above the bearing 136 (Figure 9).

Supported on the blank transfer wheel 134 are four sets of blank gripping mechanisms positioned at right angles with respect to one another around the transfer wheel. Since the four body blank gripper mechanisms are exactly alike a description of one set will suffice. Rotatably supported in bearing blocks 150 mounted on the transfer wheel 134 is a rocker shaft 151 on the projecting ends of which blank gripping hooks or fingers 152 are secured. The blank gripping fingers 152 project downwardly through openings in the transfer wheel to position the tips of the gripping fingers beneath the bottom surface of the rim of the transfer wheel. Secured to the under surface of the transfer wheel 134 between the gripper fingers 152 is a blank guide plate 153 the outer longitudinal margin of which is deflected downwardly to provide a guide flange or apron 154. Secured upon the rim of the transfer wheel 134 are two spaced angle brackets 155 having blank centering and stop flanges 156 formed thereon and projecting downwardly through slots in the transfer wheel rim adjacent the outer side of the gripping fingers 152 as clearly illustrated in Figure 8. Secured to the middle portion of the rocker shaft 151 is a crank arm 157 to the upper end of which is pivotally connected a link 158. The inner end of the link 158 is pivotally connected with a lever 159 which is pivotally connected at one end upon the top of the transfer wheel 134. Connected to the opposite end of the lever 159 is one end of a coiled control spring 160 the opposite end of which is connected to the transfer wheel as clearly illustrated in Figure 5. The spring 160 acts to resiliently hold a roller 161 in rolling contact with the periphery of the gripper control 149 as shown in Figures 8 and 9 of the drawings. The roller 161 is rotatably supported on the underside of the control lever 159. The spring 160 acts to hold the roller in contact with the control cam for governing the operation of the body blank grippers 152.

A cup body blank 89 after being advanced by the feed rollers 118 and 120 onto the table 121 (Figure 5) is engaged by the pusher arms 123 and is pushed beneath the rim of the transfer table 134 with the advance arcuate edge 88 of the blank passing upwardly over the guide flange 154 and onto the plate 153 until the cup body blank is brought into a centered position against the stop flanges 156 which project downwardly beneath the bottom surface of the rim of the transfer wheel 134. As the cup body blank 89 is advanced toward the transfer wheel the gripping fingers 152 are in their open position as illustrated in Figure 9 so that when the reduced portion of the control cam 149 is brought into engagement with the roller 161 the control spring 160 actuates the blank gripping mechanism to cause the gripping fingers 152 to swing upwardly to hold the advanced cup body blank gripped between the gripping fingers 152 and the under surface of the rim of the transfer wheel 134.

The blank transfer wheel comprises four sets of blank carrying mechanisms each of which is intermittently advanced from a blank receiving position A (Figure 5) into a glue applying position B and then into a delivery position C. The cup body blank advanced into position C is adapted to be delivered to a cup forming mechanism and said blank is released by the gripping fingers 152 just as the last quarter revolution of the transfer wheel takes place. After a cup body blank 89 has been delivered onto the table 121 in position A and is properly centered by the push arms 123 the gripping fingers 152 are released by the control cam 149 causing the control spring 160 to move the gripping fingers into closed position to grip a cup body blank against the bottom surface of the transfer wheel. The Geneva gear mechanisms 138 and 139 now cause the blank transfer wheel to be rotated one-quarter of a revolution thereby advancing the gripped centered cup body blank into position B over the glue applying mechanisms which will now be described.

As the cup body blank 89 is carried by the transfer wheel 134 from position A into glue applying position B, the projecting portion of the blank is moved into position beneath the blank heater 100 to permit stripes of adhesive or glue to be applied thereto adjacent the edges 85 and 87 by means of a glue applying pad 162 (Figure 7). The glue applying pad consists of a straight portion joined at one end by a curved portion and said pad is formed upon the top of a glue stamping plate 163 which is mounted on the upper end of a vertically slidable bar or plate 164. The glue pad supporting bar 164 is slidably mounted to operate in a vertical guide 165 having an opening 166 therein as clearly illustrated in Figure 6. Pivotally supported on the shaft 128 is one end of a lever or arm 167 having a roller 168 rotatably supported on one side thereof and in rolling contact with a glue pad control cam 169 to cause vertical reciprocation of the glue pad by means of the pivoted lever 167. The glue pad control cam 169 is secured on a shaft 170 journaled in suitable bearings provided in the framework section 129. Secured on one projecting end of the shaft 170 is a gear 171 which is in mesh with and receives a drive from a larger gear 172 secured on one projecting end of the shaft 128. The gear 172 is in mesh with and receives a drive from a smaller gear 173 secured on one projecting end of the shaft 133 as clearly illustrated in Figures 1 and 2. The shaft 133 has a bevel gear 174 mounted thereon and said bevel gear is in mesh with and receives a drive from a bevel gear 175 mounted on one end of the shaft 20 as clearly illustrated in Figures 2 and 7.

The lever 167 as illustrated in Figure 6 projects through the guide plate opening 166 and through an opening in the glue pad supporting bar 164 and has an adjusting mechanism 176 connected thereto and to the slide bar 164.

A glue applying mechanism forms a unit of the cup making machine and is provided for the purpose of applying glue to the glue pad 162. Referring to Figures 1, 5, and 6, the framework section 129 has supported thereon a glue tank or trough 177. Rotatably mounted within the tank 177 is an adhesive applying roller 178 which rotates in the glue within the tank. The roller 178 is supported on a shaft 179 one end of which projects from the tank 177 and has a gear 180 mounted thereon. The gear 180 meshes with and receives a drive from a large gear 181 which is secured upon the shaft 133. An adhesive wiping roller 182 is rotatably supported in adjustable bearing units supported in the side walls of the glue tank 177. The wiping roller 182 coacts with the glue feed roller 178 to wipe the excessive glue therefrom. Mounted on one projecting end of the shaft of the wiping roller 182 is a gear 183 which meshes with the gear 180 and receives a drive therefrom.

An adhesive transfer or applying roller 184 (Figure 6) is mounted to be moved into rolling contact with the adhesive feed roller 178 to be supplied with a coating of adhesive. The roller 184 is supported on a shaft 185 the ends of which are journaled in a pair of blocks 186 which are slidably mounted upon a pair of guide rods 187 supported on the machine framework. Pivoted on each end of the roller shaft 185 is a link 188 having one end thereof pivotally connected to the upper end of a crank arm or lever 189. The lower ends of the two crank arms 189 are pivotally supported on a shaft 190 supported in the framework section 129. Pivotally connected to one side of one of the crank arms 189 (Figure 1) is one end of an eccentric bar or rod 191 the other end of which is eccentrically connected to the gear 172.

The above described mechanisms serve to reciprocate the adhesive applying roller 184 at predetermined intervals to cause the roller to roll over the adhesive stamping pad 162 carried by the stamping plate 163 which is adapted to be reciprocated at predetermined intervals governed by the operation of the control cam 159. The glue applying roller 184 and the glue stamping pad mechanism have the operations thereof so timed that when the roller 184 is in a retracted position the glue pad 162 is adapted to be advanced upwardly to stamp or apply a straight stripe 92 and a curved stripe 93 (Figure 36) of glue to the under surface of the cup body blank 89 which has been advanced by the blank transfer wheel 134 into position B beneath the heater 100 which acts as a stop member as well as a heating member for a cup body blank which is being stamped with glue.

After a cup body blank has been moved into a glue applying position B (Figure 5) and has been stamped with stripes of glue 92 and 93 adjacent the respective edges 85 and 87 of a cup body blank the glued body blank is ready to be transferred by means of the blank transfer wheel 134 from position B toward position C to be delivered to a cup forming mandrel.

After a blank in position B has been stamped with adhesive and before the glued blank is moved by the transfer wheel from position B into position C the glue pad 162 is moved downwardly away from the blank. To prevent the glued blank from being drawn downwardly with the retracting movement of the pad 162 a separating frame 192 (Figure 7) is pivotally mounted on bracket arms 193 which are supported on framework bars 194 secured on the upper end of the framework section 129. The pivoted frame 192 is positioned beneath the blank heater 100 and above the adhesive applying pad 162 so that as a cup body blank is carried into position B by the transfer wheel the blank is carried into a position above the pivoted frame 192 with the margins 85 and 87 of the blank projecting beyond the frame 192 to permit adhesive to be applied to the under surface of the blank. It will thus be noted that as the adhesive applying pad 162 moves downwardly the pivoted frame 192 supports the stamped blank and causes the adhesived blank to be separated from the retreating pad 162. After a cup body blank has been stamped with adhesive and has been separated from the retracting pad 162 the separating frame 192 is pivotally swung downwardly away from the adhesived blank to permit the same to be carried by the transfer wheel from position B into position C (Figure 5). Pivotally connected to the underside of one end of the frame 192 is the upper end of a vertically reciprocating bar 195 which is adapted to be operated by a link 196 the lower end of which is pivotally connected to a reciprocating bar 197 which is adjustably connected to one end of an actuating bar 198. The bar 198 has one end thereof supported on a pin 199 the upper end of which is connected with a crank arm 200 secured on a pin 201 disposed in a sleeve 202 carried by a bracket arm 203 which is integrally formed on the bearing sleeve 136 as illustrated in Figure 6. The reciprocating bar 198 also has one end thereof pivotally connected to a crank arm 204 which carries a roller 205 (Figure 7) which travels in a cam groove provided in a control cam 206 secured on the shaft 140. The crank arm 204 is pivotally mounted on a stub shaft supported on the machine framework.

The cup forming units of the machine which will now be described are carried by the vertically rotatable turret wheel 79 supported on the shaft 80. Integrally formed around the rim of the turret wheel 79 is a peripheral gear 207 which is in mesh with and receives a drive from a driving gear 208 secured on an auxiliary driving shaft 209 journaled in a suitable bearing bracket provided by the framework top section 5 as clearly illustrated in Figure 11. Secured on the inner end of the auxiliary shaft 209 is a disc 210 having a pair of parallel guide bars 211 which are rigidly secured on one surface of the disc on opposite sides of the center thereof to provide a guide groove 211a. Freely slidable in the guide groove provided between the bars 211 is a slide block 212 suitably apertured to freely journal a pin 213a (Figure 14) eccentrically mounted on one side of a disc 213 supported on the inner end of a shaft 214 journaled in a bearing bracket 215 and in a bearing formed in the framework top section 5 (Figure 11). Secured on the auxiliary shaft 214 is a gear 216 which is in mesh with and receives a drive from the gear 75 (Figure 3). It will be noted that the shafts 209 and 214 are out of alignment. Therefore, the shaft 214 will drive the shaft 209 and consequently the turret wheel 79 at a variable speed; i. e., when the pin 213a is in the position seen in Figure 14, the shaft 209 is driven at a slower speed than when the pin is in the lower position after the disc 213 has turned approximately 180 degrees. In other words, as the distance between the center of the pin and the center of the shaft 209 increases, the shaft 209 is driven faster, and vice versa, during the rotation of the shaft 214 at constant speed.

A cup body blank 89 after having stripes of adhesive stamped thereon is carried by the blank transfer wheel 134 from position B (Figure 5) into position C to project the straight margin 86 of the blank into a longitudinal slot of a cup forming mandrel forming a part of the cup forming unit. The turret wheel housing 83 is open at the front and at the rear and has a mutilated or half of an internal gear 217 mounted in the rear end thereof to the inside of a stationary control cam 218 which extends substantially half way around the turret wheel housing 83 (Figure 15) and opposite from the position of the half internal gear 217.

The turret wheel 79 has four bearing sleeves 219 formed therein and spaced 90° apart. Rotatably supported in the four bearing sleeves 219 of the turret wheel are four container or cup forming mandrel mechanisms of similar construction and each comprising a flanged spindle 220 projecting through one of the turret wheel sleeves 219 and having a reduced extension 221 integrally formed on the rear end thereof. Keyed on the shaft or spindle extension 221 is a sleeve 222 having a cam block 223 formed thereon intermediate the ends thereof. The cam block 223 during the rotation of the turret wheel 79 is brought into engagement with the control cam 218 to ride thereover into the position illustrated in Figure 17 to hold the mandrel supporting shaft or spindle 220 against rotation. Pinned or otherwise secured on the sleeve 222 adjacent the inner side of the cam block 223 is a gear 224 which is adapted to be brought into meshing engagement with the half internal gear 217 during a half revolution of the turret wheel 79. Secured on the outer end of the sleeve 222 is a cam disc 225 having a cam notch 226 formed therein as illustrated in Figure 15. Projecting from the inner side of the cam disc 225 is a pin or post to which one end of a coil control spring 227 is secured. The other end of the control spring 227 is engaged on a pin or post 228 which projects through the cam notch 226 and is supported on the free end a control pawl 229 which is pivotally mounted on one side of the cam disc 225 (Figure 15). Rotatably supported on the outer side of the control pawl 229 is a roller 230 which coacts with a short crank arm 231. Secured on the sleeve of the crank arm 231 is a bell crank member comprising a bell crank arm 232 and a second bell crank arm 233. Each of the bell crank arms 232 and 233 are of split construction as illustrated in Figure 15 and are connected in place upon the sleeve or hub of the crank arm 231 by means of a clamping bolt 234 to permit the crank arms 232 and 233 to be adjusted with respect to one another and with respect to the crank arm 231 for the proper control of the blank gripping mechanisms carried in the forming mandrels. The bell crank arms 232 and 233 are so positioned that during the operation of the cup making unit the bell crank arm 232 will be moved into a position to coact with a stationary control cam 235 (Figure 15) which governs the closing of the gripper mechanisms when a forming mandrel is in a blank receiving position D of a cup forming unit.

To facilitate explanation of the operation of the cup forming unit the various mandrels forming a part thereof are adapted to be carried to successive positions from the position or station D to intermediate stations E and F and finally to a cup discharge station G (Figure 14). The bell crank arm 233 is so positioned that the outer end thereof during the rotation of the turret wheel is adapted to be brought into contact with a stationary finger or rod 236 which is adjustably secured by means of a set screw in a holding sleeve 237 secured on the upper portion of the rear surface of the turret wheel casing or housing 83 as illustrated in Figure 15. The operation of the bell crank arm 233 by the stationary finger 236 controls the opening of the gripper mechanism of the forming mandrel to permit release of a finished cup as a mandrel is moved into position G to permit a finished cup to be discharged from the machine.

The control crank arm 231 and the gripper control bell crank arms 232 and 233 are keyed or otherwise secured on a projecting portion of a gripper control sleeve or stem 238 which projects through and is rotatable in the spindle or sleeve 220 as clearly illustrated in Figure 19.

The front end of the gripper control sleeve or stem 238 projects into a recess 239 provided in the outer end of the spindle 220 and has secured thereon a gripper control sleeve 240 the outer end of which is closed by means of a flanged head 241 which is disposed adjacent the outer end of the spindle 220 (Figure 19). A chambered cup forming mandrel 242 is rigidly secured on the outer projecting end of the spindle 220 to be rotated thereby. Of course, the rotation of the mandrel will be at a variable speed, since it is responsive to the speed of the turret wheel 79 through its respective gear 224 and the half gear 217. Engaged in the outer end of the frustrum shaped cup forming mandrel 242 around the flanged head 241 is a release ring 243. Each of the cup forming mandrels 242 is provided with a gripper chamber 244 and with an outlet opening or recess 245 (Figure 20) into which a gripper blade 246 projects for the purpose of gripping a straight margin 86 of a cup body blank 89 when a cup body blank is advanced to a mandrel by the cup body blank transfer wheel 134. The gripper blade 246 is tangentially formed on a gripper collar or sleeve 247 which is engaged around the outer end of the spindle 220 within the chamber 244. The inner surface of the gripper sleeve 247 is provided with an opening or recess 248 into which a gripper actuating finger 249 projects. The gripper actuating finger 249 is integrally formed radially on the sleeve 240 and projects outwardly through an opening 250 provided in the spindle 220 as clearly illustrated in Figures 20 and 21.

Each of the gripper control stems 238 is provided with a compressed air outlet passage 251 which communicates with a main air outlet chamber 252 provided in the mandrel plug 240 as illustrated in Figure 19. Each of the mandrels 242 has the plug end 241 thereof provided with a plurality of auxiliary air outlet passages 253 which extend from the main air outlet chamber 252 outwardly through the exterior surface of the mandrel end closure plug or plate 241. In order to assist the pneumatic discharge of a cup from the mandrel 242 when in position G a cup is first loosened on the mandrel by slightly pushing the cup outwardly by means of the release ring 243 the inner peripheral surface of which is provided with spiral grooves which receive inclined or spiral teeth 254 (Figure 21) which when the mandrel plug 240 is rotated relative to the stem 220 causes the release ring 243 to slide outwardly beyond the end of the mandrel on guide pins 255 (Figure 19) so that a finished cup is partially released thereby requiring only a slight blast of compressed air through the outlet passages 253 to blow a finished cup off of a mandrel. A reverse rotation of the stem 238 after a cup has been discharged will cause retraction of the cup release ring 243 to move the same back into the end of the mandrel before another cup bottom is engaged against the end of the mandrel.

For the purpose of discharging a completed loosened cup from one of the forming mandrels 242 a compressed air discharge unit is supported on the top of the bearing bracket 81 as illustrated in Figure 11. Secured on the rear projecting end of the stem 238 is a disc or plate 256 which when a mandrel reaches position G has the central opening thereof brought into register with a compressed air supply passage 257 (Figure 16) provided in the upper portion of the bearing bracket 81. A charge of compressed air is thus permitted at a predetermined time to be admitted into the mandrel air chamber 252 so that a plurality of charges of compressed air are adapted to be emitted through the outlet passages 253 to cause the previously loosened cup to be blown off of the mandrel immediately following the release of the gripper blade 246 and the loosening of a cup by means of the release ring 243.

Connected in the outer end of the air passage 257 is an air pipe 258 on the outer end of which an air valve unit 259 is secured. A compressed air supply pipe 260 is connected with the upper end of the valve unit 259 to permit a charge of compressed air to be admitted to the machine from any suitable source of air supply. Secured to the exterior of the casing of the valve unit 259 is a downwardly projecting bracket arm 261 (Figure 11) on the lower end of which an arm or beam 262 is fulcrumed intermediate its ends. One end of the beam 262 is pivotally connected to the lower projecting end of a valve stem 263 which controls the operation of the air valve within the air valve unit 259. Pivotally connected to the opposite end of the fulcrumed beam 262 is the upper end of a connecting bar or rod 264 (Figure 2) the lower end of which is pivotally connected to one end of a control arm 265 which is fulcrumed intermediate its ends to one side of the framework section 21 as illustrated in Figure 5. The second end of the fulcrumed arm or lever 265 is positioned to be actuated at predetermined times by an eccentric pin 266 projecting from the outer side of the gear 40.

Supported on the turret wheel shaft 80 is a cup presser unit comprising a hub 267 having radially directed spokes 268 projecting therefrom. Bolted or otherwise removably secured to the spokes 268 is a half wheel rim 269 the outer peripheral surface of which is beveled or inclined at an angle corresponding to the taper of the cup forming mandrels 242. Supported on the outer peripheral surface of the wheel rim section 269 is a soft pad 270 constructed of sponge rubber or other suitable material over which a thin layer of sheet metal 271 is disposed (Figure 13) to serve as a resilient presser shoe over which the body portions of the cups are adapted to be rolled from substantially position D to E and slid therealong beyond position F. The cup body blanks 89 which are wound around the cup forming mandrels 242 are thus brought into contact with the resilient presser pad 271 during the time the cups are translated from position D until they pass through positions E and F so that the glued overlapping margins of the cups are sufficiently pressed together before reaching the discharge position G. It will be seen that because of the substantially tangential pressure of the presser member the stock of the body portion of the cup is kept under tension during the subsequent finishing operations.

Where the term "tension" is used herein and in the appended claims, this term is used in the sense of applied tension as distinguished from the mere inherent pull on the outer fibers of material formed into cylindrical or other shape out of the flat.

At a predetermined time in the operation of the machine the cup bottom 90 which is formed by the punch mechanism illustrated in Figure 23 is projected outwardly through the discharge opening 272 (Figure 10) between transfer fingers or tongs 273 and 274. The finger or tong 273 is integrally formed on one end of an arm 275 which is keyed or otherwise secured on one end of a stub shaft 276 which is journaled through the bracket arm 82. The transfer finger 274 is pivotally supported on the arm 275 and is adapted to be resiliently held in closed position by means of a control spring 277 having one end thereof secured to the arm 275 while the free end of the stub spring 277 contacts the outer side of the pivoted transfer finger 274. Secured on the end of the stub shaft 276 opposite the arm 275 is a gear 278 which is in mesh with a rack 279 which is secured on the outer side of the lower forked or slotted end of a connecting bar 280 which is disposed adjacent the outer side of the iron bracket 82 with the slot engaged over the stub shaft 276, to serve as a means for guiding the connecting bar 280 when it is reciprocated. The upper end of the connecting bar 280 is provided with an end slot 281 to permit the upper end of the connecting bar 280 to engage around the shaft 56. Supported on one side of the upper portion of the connecting bar 280 is a roller 282 which projects into a cam groove 283 provided in one side of a transfer actuating control cam 284 which is secured on the shaft 56 to be rotated thereby.

When a cup bottom 90 is forced outwardly through the die opening 272 the transfer arm 275 is in its upper position so that the transfer fingers 273 and 274 provide an opening therebetween which is in register with the die outlet opening 272 thereby permitting a cup bottom to be pushed out of the die block 58 into the transfer arm with the transfer fingers 273 and 274 engaging around the flange 91 of the cup bottom. As soon as a cup bottom has been delivered between the transfer fingers 273 and 274 the control rack 279 is moved upwardly thereby causing the transfer arm 275 to swing from its upper position downwardly into the full line position illustrated in Figure 10 to transfer a cup bottom 90 into a position in axial alignment with a cup bottom positioning mechanism which at predetermined times in the operation of the machine is adapted to be positioned in alignment with the cup forming mandrel when the same is in blank receiving position D.

The cup bottom positioning and holding mechanism is illustrated in detail in Figure 26 and is supported in the outer end of an arm 285 of a three armed or T-rocker spider which is rotatably supported on the shaft 80 adjacent the outer side of the lower end of the bracket 82. The rocker spider in addition to the arm 285 consists of an arm 286 which projects opposite from the arm 285 and an intermediate arm 287 which projects downwardly at substantially right angles to the arms 285 and 286. The rocker spider is provided with a hub extension 288 on which the hub 289 of an auxiliary shiftable three armed spider is slidably supported. Integrally formed on the hub sleeve 289 are three radially directed spokes or arms 290, 291, and 292 disposed at substantially right angles with respect to one another adjacent the respective arms 285, 287, and 286 respectively. Secured on the spider hub sleeve 289 is a collar 293 having a downwardly directed arm 294 integrally formed thereon. Integrally formed on the lower end of the bracket arm 294 is an axially passaged guide sleeve or head 295 (Figure 13) adapted to be slidably shifted on a guide pin or rod 296 the outer end of which is rigidly secured in the lower end of a bracket 297 the upper end of which is rigidly secured on the outer end of the main shaft 80. The collar 293 is adapted to be alternately shifted back and forth on the spider hub or sleeve 289 by means of two pairs of pivotally connected toggle members 298 and 299 positioned on opposite sides of the shiftable collar 293 and the bracket arm 297. The ends of the two toggle members 298 are pivotally connected on pins on opposite sides of the shiftable collar 293 while the outer ends of the two toggle members 299 are pivotally connected to pins on opposite sides of the upper portion of the bracket arm 297. Pivotally connected to each of the toggle members 299 is the upper end of an actuating link 300. The lower ends of the two actuating links 300 are pivotally connected on pins projecting from opposite sides of a yoke head 301 (Figure 10) which is integrally formed on the upper end of a vertically reciprocating control bar 302 having a guide ring or collar 303 integrally formed near the lower end thereof through which the shaft 214 projects as clearly illustrated in Figure 11. The upper yoke end 301 of the reciprocating bar 302 is slidably engaged over a reduced portion of the lower end of the bracket 297. Integrally formed on the lower end of the ring portion 303 of the reciprocating bar 302 is an arm 304 which carries a roller 305 which travels in a cam groove 306 provided in one side of a control cam 307 secured on the auxiliary shaft 214. It will thus be noted that the auxiliary spider 290—292 is alternately moved toward and away from the main spider 285—287 to permit a plurality of mechanisms such as a bottom blank applying unit, a cup crimping unit and a cup ironing unit to be moved to act on cups carried by the cup forming mandrels of the rotatable turret wheel.

The main rocker spider is adapted to be alternately rotated back and forth on the shaft 80 by means of a link 308 one end of which is pivotally connected to an extension on the side of the spider arm 287 (Figure 10) while the outer end of the link 308 is pivotally connected to the upper end of a lever 309 the lower end of which is pivotally supported on the outer side of the framework sill 4 as clearly illustrated in Figure 1. Rotatably mounted on one side of the control lever 309 is a roller 310 which tracks in a cam groove 311 provided in one side of the control cam 307 as clearly illustrated in Figure 10.

The main rocker spider and the auxiliary rocker spider are connected to be simultaneously rocked by means of the cam actuated lever 309 and said spiders are connected by means of the bottom blank placing unit, the crimping unit and the ironing unit which are respectively illustrated in detail in Figures 26, 27, and 28. The reciprocating spiders are actuated in timed relation with respect to the rotation of the turret wheel so that the bottom placing units, the crimping units and the ironing units are at times adapted to travel in axial alignment with the cup forming mandrels during the cup forming operations.

When a cup bottom 90 is transferred from the punch die 58 it is carried downwardly by the transfer arm 275 into a position to be disposed between the outer end of a cup forming mandrel 242 in position D and a bottom placing plunger head 312. The plunger head 312 forms a part of the cup bottom placing unit and is formed on the outer end of a shank or stem 313 slidably engaged in an axial opening 314 provided in the inner end of a bolt 315. The coiled spring 316 is engaged in the opening 314 behind the stem 313 and normally acts to resiliently hold the plunger head 312 projected in its outermost position. The outward movement of the plunger head 312 is controlled by means of a stop pin 317 which projects radially from the stem 313 into a guide slot 318 provided in one side of the recessed inner end portion of the bolt 315 as clearly illustrated in Figure 26. The outer end portion of the bolt 315 is externally threaded and is adjustably engaged through a head or collar 319 which is rigidly secured on the outer end of the spider arm 290 of the shiftable auxiliary spider. A nut 320 is engaged on the outer projecting end of the bolt 315 to hold the bolt in a set position of adjustment with respect to the supporting collar 319 of the auxiliary spider. When a cup bottom 90 is brought into position H (Figure 10) the plunger head 312 is in a retracted position to permit said head to be projected outwardly within the flange 91 of a cup bottom 90 to resiliently push the cup bottom 90 out of the transfer mechanism and against the outer end of a cup forming mandrel 242 in position D. As soon as a cup bottom has been placed against the outer end of a mandrel in position D the mandrel together with the bottom holding unit simultaneously travel downwardly causing the spring controlled transfer finger 274 (Figure 10) to swing outwardly permitting the placed cup bottom to be moved downwardly out of engagement with the transfer fingers of the transfer arm 275.

Immediately following the placing of a cup bottom 90 against the outer end of a mandrel 242 in position D a cup body blank 89 is delivered by the cup body blank transfer wheel 134 from the gluing unit so that the advanced edge 86 of a cup body blank is projected between a pair of cup body blank guide blades 321 and 322 (Figurges 24 and 25) so that the cup body blank is supported when released by a pair of grippers 152 of the blank transfer wheel 134. With the advanced edge 86 of a cup body blank projected into a mandrel opening 245 the blank is adapted to be gripped by the grippers 246 (Figure 20) thereby allowing the cup body blank to be rolled around a rotating mandrel 242 and around the flange 91 of a cup bottom 90 engaged against the outer end of the mandrel. One end of the blank guide finger 321 is rigidly secured to the bottom of a collar 323 which is rigidly secured to one side of the outer end of the spider arm 285. The blank finger 322 is pivotally supported on the guide finger 321 and has integrally formed on one end thereof a tongue or projection 324 which at a predetermined time in the operation of the machine is adapted to be brought into contact with a control finger 325 secured on the bottom of the bottom blank punch housing 43 (Figure 22) to cause the lower guide blade 322 to swing upwardly toward the guide blade 321 into the position illustrated in Figure 3 ready to guide another cup body blank to a forming mandrel 242 when in position D. The glued cup body blank which is guided between the guide blades 321 and 322 and has the margin 86 thereof projected into a mandrel opening 245 to be gripped by the gripper 246 is rolled around the mandrel 242 due to the rotation of the mandrel by the gear 224 coacting with the internal mutilated gear segment 217 (Figure 17) with the travel of a mandrel from position D toward position E. With the rotation of the cup body blank around a mandrel the glued margin 85 of a cup body blank is lapped over the body blank margin 86 and the two overlapping margins are secured together by the stripe of adhesive 92 while the stripe of adhesive 93 is brought into contact with the outer surface of the flange 91 of the cup bottom 90.

The partly formed cup is carried by the rotating turret wheel from position D into position E to bring the partly formed cup and its supporting mandrel into axial alignment with the cup crimping unit supported by the arms 287 and 291 of the main and auxiliary rocker spiders.

The next step in the operation of the forming of a cup is to cause the margin 87 of a cup body blank to be deflected and crimped around the flange 91 of the cup bottom. This deflecting and crimping of the lower margin of the partly formed cup is done by the crimping unit illustrated in detail in Figure 27. The crimping unit comprises a bolt 326 having one threaded end thereof adjustably engaged in the internally threaded outer head end 327 of the spider arm 291. Engaged on the outer projecting end of the bolt 326 is a retaining nut 328. The bolt 326 has a plane portion which slidably projects through the outer end of the spider arm 287. Secured in the inner end of the bolt 326 is the shank end 329 of a crimper sleeve 330 having a pair of diametrically opposite slots 331 formed therein. Integrally formed on the outer end of the crimper sleeve 330 is a disc or plate 332 having a ring of spaced crimping teeth 333 integrally formed on the outer face thereof. Slidably mounted in the crimper sleeve 330 is the shank or stem 334 of a plunger head 335. Engaged in the crimper sleeve 330 behind the end of the stem 334 is a coiled spring 336 which normally acts to hold the plunger head pin 335 projected to permit the same to resiliently seat against the outer surface of a cup bottom 90 to hold the same in position against the end of a mandrel 242. The outward movement of the plunger head 335 is limited by means of a wedge bar or pin 337 which is secured diametrically through the stem 334 and has the ends thereof projecting through the slot 331 of the crimper sleeve 330.

A rim deflecting mechanism is slidably supported on the crimper sleeve 330 and comprises a deflecting disc 338 having integrally formed on the outer face thereof a plurality of spaced deflecting teeth 339 which normally are adapted to be projected through radial notches or openings provided in the crimper disc 332 between the crimping teeth 333. Engaged around the periphery of the deflecting disc 338 is a deflecting sleeve or ring 340 having a beveled or inclined deflecting rim 341 integrally formed in the outer projecting end thereof. As clearly illustrated in Figures 33 and 34 the rim 341 of the deflecting mechanism is adapted to be engaged over the bottom end of a cup on a mandrel 242 to serve as a reinforcing means for the bottom portion of a cup during the deflecting of the lower margin of the cup around the flange 91 of a cup bottom. Integrally formed on the deflecting head 338 is a hub sleeve 342 which has a pair of diametrically opposite slots 343 formed therein to which the end of the pin or wedge 337 projects to limit the outward movement of the rim deflecting disc 338 on the crimping sleeve 330. Engaged around the hub sleeve 342 is a coiled spring 344 the outer end of which is adapted to seat against a flange ring secured around the inner end of the crimping sleeve 330 as clearly illustrated in Figure 27.

While a partly formed cup on a mandrel is being carried from position D toward position E a bottom holding head 312 is retracted as is also the deflecting and crimping mechanisms due to the movement of the auxiliary spider away from the main spider thereby permitting the partly completed cup to advance into position E and into axial alignment with the retracted deflecting and crimping mechanism so that when the auxiliary spider is again moved toward the main spider the plunger head 335 is first moved into contact with the outer surface of the cup bottom 90 after which the rim shoe or ring 341 passes over the lower end of the partly formed cup body permitting the deflecting teeth 339 to first engage the projecting lower margin 97 of a cup to cause an inward bending or deflection of the bottom rim as indicated in Figure 33 after which the crimping teeth 333 are moved outwardly from the position indicated in Figure 33 toward the position indicated in Figure 34 thereby causing the deflected lower rim of the cup to be crimped around the flange 91 of the cup bottom. After the crimping of the bottom margin of a cup body blank around the flange of a cup bottom the deflecting and crimping mechanisms are again retracted due to the movement of the auxiliary spider away from the main spider thereby permitting the partly formed cup on a mandrel 242 in position E to be carried toward position F into axial alignment with a cup bottom rim ironing unit which will now be described.

Referring to detailed Figures 28 to 31 inclusive the cup ironing mechanisms are supported on the main spider arm 286 and the shiftable spider arm 292. Secured in an internally threaded head 345 secured on the outer end of the spider arm 292 is the threaded end of a bolt 346 which is secured in an adjusted position by means of a nut 347. Integrally formed axially on one end of the bolt 346 is a stem 348 having a section thereof cut away to form a reduced section 349. Integrally formed on the outer end of the bolt stem 348 is a rounded control finger 350 the inner end of which is separated from the end of the stem 348 by a stop flange 351. Slidably engaged on the bolt stem 348 is a plunger sleeve 352 having a plunger head 353 formed on the outer portion thereof. Engaged around the bolt stem 348 between the inner end of the sleeve 352 and the inner end of the threaded shank portion 346 of the bolt is a coiled spring 354 which normally acts to hold the plunger sleeve 352 projected outwardly. The outward movement of the plunger sleeve 352 on the stem 348 is limited by means of a stop pin 355 which projects through the sleeve 352 adjacent the reduced section 349 of the bolt stem. Secured in a longitudinal groove provided in one side of the plunger sleeve 352 is a key 356 which is adapted to have slidable engagement with the hub portion of a gear 357.

The gear 357 is held in position adjacent one side of the passaged outer end of the spider arm 286 by means of a retaining hood 358 which is secured to the outer end portion of the spider arm 286. Secured to or forming a part of the outer end of the ironing head 353 is an ironing rim or ring 359 having a beveled interior surface shaped complementally to the shape of the lower end of a flat bottomed cup to serve as a backing against which the outer surface of the base flange of a cup is adapted to be pressed during an ironing operation. Projecting axially into the ironing head is an extension sleeve or hub 360 having three equidistantly spaced longitudinally disposed slots 361 formed therein through which the beveled ends of three control pawls 362 project. The control pawls 362 are pivotally mounted on stub shafts 363 which are supported in suitable bearings provided within the crimping head 353. Also pivotally mounted on each one of the stub shafts 363 is a segment shaped ironing section 364 which is shaped to project into the lower portion of a cup to be moved outwardly into engagement with the inner side of the base flange of the cup to permit ironing of the base flange when the segment shaped ironing shoes 364 are moved outwardly into an ironing position as illustrated in Figure 31 due to the action of the control finger 350 against the control pawls 362 when the ironing head is rotated by means of the gear 357. A coiled control spring in the form of a ring is engaged around the ironing shoes 364 to cause the same to pivotally swing inwardly toward one another to project the control pawls 362 inwardly through the slots 361 when the control finger 350 is retracted.

As illustrated in Figures 10 and 35 the ironing mechanism is adapted to be rotated by means of the gear 357 which is in mesh with a gear segment 366 provided with a shank extension or arm 367 which is pivotally mounted on a stub shaft or pin 368 projecting from one side of the spider arm 286. Rotatably mounted on one side of the gear segment 366 is a control roller 369 which is positioned to project into a cam slot 370 provided in one side of an arm 371 which is integrally formed radially on the bearing hub for the shaft 80, formed on the lower end of the bracket 82. Due to the rocking arrangement of the main spider the rocking movement of the spider arm 286 causes pivotal swinging of the gear segment 366 thereby alternately causing rotation of the gear 357 in opposite directions to cause rotation of the ironing mechanism first in one direction to cause thorough ironing of the crimped base flange of a cup carried on a forming mandrel, and then in the other direction to restore the mechanism into original position for the next cup.

The rim or bead forming mechanism of a cup will now be described. During the completion of the ironing of the base portion of a cup in position F of the rotating turret wheel the rim bead forming operation takes place during the travel of a partly formed cup through position F toward position G. There is associated with each of the cup forming mandrels a rim deflecting and curling mechanism adapted to spin or curl a tight drinking bead on the upper open end of a cup. The rim curling mechanisms of the various mandrels on the turret wheel are all controlled by a stationary control cam 372 having a cam groove 373 formed therein. The control cam 372 is rigidly secured on the hub of the bearing bracket 81 (Figure 16).

A rim curling mechanism is associated with each one of the cup forming mandrels and is supported on the turret wheel and on the respective mandrel shafts 220. Tracking in the cam groove 373 is a roller 374 which is rotatably supported on a pin carried at right angles on the inner end of a control rod 375 which slidably projects through an opening in the turret wheel 79. Supported on the front projecting end of the slide rod 375 is a forked shifting arm 376 the upper forked end of which engages around a collar 377 which is shiftably engaged on the mandrel shaft 220 as clearly illustrated in Figure 19. Rotatably supported on a hub extension of the shiftable collar 377 is a crimping pulley 378 having a hub extension which projects toward the inner end of a mandrel 242 and has adjustably engaged thereon a rim deflecting and curling die 379 having a bead forming groove 380 formed in the outer end thereof as clearly illustrated in Figure 19. The bead forming groove 380 is so positioned that when the pulley 378 is shifted toward the inner end of a mandrel the groove 380 is adapted to be engaged over the rim of a cup on the mandrel 242 to deflect and curl the rim due to the rapid spinning or rotation of the rim forming die 379 caused by the spinning or the rotation of the pulley 378 which is accomplished by means of a belt 381.

The belt 381 is positioned to coact with a bead forming roller 378 as a mandrel and its coacting mechanisms are carried by the turret wheel 79 toward position F and for a short time after the mandrel passes through position F and is advanced toward position G. As illustrated in Figures 1 and 14 the belt 381 is trained over an upper pulley 382 and over an intermediate pulley 383 both of which are rotatably supported on a framework bracket 384 forming part of the machine framework. The belt 381 is also trained around a driving pulley 385 which is supported on a shaft 386 which is journalled in a pivoted arm 387 having one end thereof pivotally supported on a shaft carried in a bearing bracket 388. A weight 389 is hung on the outer end of the pivoted arm 387 to serve as a means whereby the driving pulley 385 is adapted to hang or seat in the lower bight portion of the belt 381 to properly tension the same. Secured on one end of the pulley shaft 386 is a small gear 390 which is in mesh with and receives a drive from a larger gear 391 which is secured on a shaft 392 journalled in the bearing bracket 388 (Figure 3). The shaft 392 has a bevel gear 393 secured thereon which is in mesh with a bevel gear 394 secured on the driving shaft 6. A control clutch mechanism 395 mounted on a shaft 392 is adapted to be operated by means of a control lever or the like for connecting or disconnecting the drive to the belt 381.

When the rapidly rotated rim forming die 379 is finally moved outwardly again against the upper margin of a cup on a mandrel 242 in order to curl the margin to form a finishing bead 396 on the cup (Figure 12) a pair of bevel surfaced segment shaped clamping shoes or blocks 397 which have previously been consecutively moved into gripping or clamping engagement with the exterior portion of a cup on a mandrel 242 immediately adjacent the bottom of the cup bead 396 serve to hold the body of the cup on the mandrel as the bead is completed. The clamping shoes 397 are formed with a die groove at 398 (Figure 19) to coact with the die groove 380 of the spinning die 379 to rapidly and tightly form the cup bead 396 to provide a curled or rolled drinking rim on the flat bottom cup.

The cup clamping shoes 397 are secured to the outer ends of a pair of long arms 399 the inner ends of which are integrally formed on U-shaped brackets 400. The brackets 400 are pivotally supported on shafts 401 which are journalled in suitable bearing brackets provided in bearing blocks or bosses 402 which are integrally formed on the outer face of the turret wheel 79. Integrally formed on the outer end of each of the U-shaped brackets 400 is an arm 403. The two arms 403 of a pair of the brackets associated with a mandrel mechanism are connected by means of a coil control spring 404 which act to resiliently hold the clamping shoes 397 in contact with the outer surface of a cup on the mandrel. Integrally formed on the inner end of each of the U-shaped brackets 400 is a short arm 405 which carries a rotatable roller 406 on the outer end thereof. The two control rollers 406 are resiliently held in rolling contact on opposite sides of a cam control plate 407 (Figure 18) having the cam edges so formed that the shoes 397 are consecutively moved into contact with a cup body blank as it is being wound on a mandrel to assist in the proper forming of the cup body. The cam plate 407 is secured on a guide post or rod 408 which slidably projects into an opening 409 provided in the turret wheel 79 to the outside of the opening in which the rod or shaft 375 projects as clearly illustrated in Figure 16. The outer reduced end of the bar 408 projects into an opening provided in the yoke arm 376 thereby permitting the cam plate 407 to be moved alternately outwardly and inwardly when the forked arm 376 is moved by the shaft 375 due to the action of the control cam 372. Normally the rollers 406 ride on the wide part of the cam plate 407 thereby causing the arms 399 to be swung into their outer positions causing tensioning of the control spring 404 and movement of the clamping shoes 397 away from a cup forming mandrel. As a mandrel approaches position E the cam plate 407 is moved outwardly due to the action of the control cam 372 so that as the crimping die 379 is moved toward the edge of a cup body blank being wound around the mandrel the tension spring 404 acts to resiliently first move one of the two clamping shoes 397 inwardly into engagement with the upper portion of the cup body blank and then move the second clamping shoe 397 against the opposite side of the cup body in timed relation controlled by the opposite cam edges of the cam plate 407.

In the forming of a cup on a mandrel 242 a cup bottom 90 is first placed against the outer end of the mandrel after which a cup body blank 89 is fed to the side of the mandrel and is gripped by the gripper 246. With the advance of the mandrel from station D toward station E the mandrel is rotated thereby causing the cup body blank 89 to be wound around the mandrel. With the winding of the cup body blank 89 around the mandrel the control cam plate 407 starts to move outwardly thereby first causing one of the clamping shoes 397 to move into contact with the blank after which the second clamping shoe is moved into contact with the opposite side of the cup body formed from the body blank. The clamping shoes serve to insure proper rolling of the cup body blank around the mandrel.

As the mandrel approaches station E the control cam 372 has the cam groove 373 so shaped that the rim forming die mechanism is intermittently advanced toward the inner end of the mandrel, and at the end of the first advance moves the die 379 into contact with the upper edge of the cup body and acts as a stop for one end of the cup body as the opposite end is deflected and crimped around the flange 91 of the cup bottom 90.

In traveling from station E to stations F and G the mandrel is held against rotation during the operation of the bottom crimping and ironing mechanisms. As the mandrel advances from station E to F the crimping mechanism is retracted and the ironing mechanism is advanced into engagement with the crimped end of the cup. While the ironing mechanism acts on the bottom end of the cup the control cam groove 373 acts to cause the rim forming die 379 to again advance outwardly to deflect the upper margin of the cup body while the spinning action of the advancing die 379 causing a spiral rolling of the deflected margin of the cup to form a tightly rolled rim bead. During the forming of the rim bead the ironing mechanism acting on the bottom end of the cup also serves as a stop mechanism to hold the cup on the mandrel assisted by the clamping shoes 397.

As the finished cup is carried by the mandrel from station F toward station G the ironing mechanism is retracted as is also the die mechanism 379 while the retreating cam control plate 407 first causes one of the clamping shoes 397 to move away from the cup and then causes outward movement of the other clamping shoe. As a completed cup is carried by a mandrel into position G the gripper release control arm 233 is carried into engagement with the stationary control finger 236 (Figure 15) to cause pivotal swinging of the control arm 233 from the position illustrated in position F of Figure 15 into the gripper release position of said control arm 233 as illustrated in position G. This pivotal swinging of the control arm 233 causes a partial rotation of the gripper control spindle or shaft 238 which in turn causes rotation of the mandrel plug 240 thereby causing the finger 249 (Figure 20) to partially rotate the gripper sleeve 247 thereby causing the gripper blade 246 to be moved from the closed position illustrated in Figure 20 into an open position thereby releasing the gripped margin 86 of the cup body blank. The spring controlled pawl arm 229 has the roller 230 thereof coacting with the cam or projection 231 (Figure 15) of the control arm 233 to resiliently hold the gripper 246 in gripping engagement with the margin 86 of a cup body blank so that the gripper is adapted to be actuated with a snappy action at predetermined times to either grip a cup body blank or release the gripped margin of a completed cup.

When the mandrel spindle or stem 238 is partially rotated within the mandrel shaft 220 the mandrel plug 240 is also caused to rotate within the mandrel 242 thereby causing the inclined teeth 254 on the head portion 241 of the plug to coact with the inclined grooves provided in the ejector ring 243 to cause said ring to be projected a slight distance out of the end of the mandrel due to the provision of the pins 255 which project from the ejector ring into slots in the mandrel to prevent rotation of the ejector ring with respect to the mandrel. The slight outward projection of the ejector ring 243 causes the finished cup on the mandrel to be loosened or slightly projected outwardly on the mandrel to break any vacuum which might exist between the cup and the mandrel preparatory to discharging the cup from the machine.

As a mandrel is advanced into the discharge position G the disc 256 (Figure 16) on the rear end of the passaged gripper control stem or sleeve 238 is brought into axial alignment with the air supply passage 257 provided in the upper projecting portion of the framework bracket 81. At this stage in the operation the compressed air control eccentric pins 266 (Figure 5) actuate the fulcrumed lever 265 which in turn operates the connecting bar 264 to operate the fulcrumed beam or bar 262 (Figure 2) to cause the compressed air control valve in the valve housing 259 to be opened to permit a charge of compressed air from the supply pipe 260 to be admitted into the passage 257 and the passage 251 to admit a charge of compressed air into the air chamber 252 of a mandrel (Figure 19). From the compressed air chamber 252 the air is permitted to escape through the auxiliary outlet passages 253 to strike against the interior of the bottom of the release cup to blow the cup off of the mandrel and into a suitable receiver.

As a cup is being released and discharged from a mandrel in position G another adhesived cup body blank 89 is fed by the blank transfer wheel 134 to a mandrel 242 in position D to be gripped by the grippers 246 to be wound around the mandrel and around a flanged cup bottom 90 previously placed against the outer end of the mandrel. With the continuous rotation of the turret wheel at variable speeds a plurality of cups are simultaneously under process of construction so that with the four mandrel arrangement disclosed a completed cup is discharged from position G at each quarter revolution of the turret wheel.

The operation of the various mechanisms comprising the machine have been set forth in combination with the description of the various parts. While the description has been directed to cover the making of flat bottom cups with curled bead rims it will of course be understood that other shapes and types of containers may be made by the machine with slight modification of the parts.

It will furthermore be understood that many changes may be made and numerous details of construction may be varied through a wide range without departing from the principles of this invention and it is therefore not the purpose to limit the patent granted hereon otherwise than necessitated by the scope of the appended claims.

I claim as my invention:

1. A cup forming machine comprising in combination, a rotatable turret wheel, a plurality of mandrels rotatably mounted thereon, grippers in said mandrels, means for rotating the turret wheel, means for rotating the mandrels during one-half revolution of the turret wheel, means for holding the mandrels against rotation during the remaining half revolution of the turret wheel, mechanisms operated from the machine for punching out, shaping and delivering cup bottoms against the ends of said mandrels, a rotatable blank transfer wheel, means for feeding cup body blanks to the transfer wheel, a gluing device for applying stripes of glue to the cup body blanks carried by the transfer wheel, means for operating the transfer wheel to cause glued cup body blanks to be deliverd to said mandrels to be gripped by the grippers, a pair of rocking spiders, a cup bottom applying unit, a crimping unit and an ironing unit supported by said spiders, means for simultaneously rocking said spiders alternately in opposite directions to permit the bottom placing unit, the crimping unit and the ironing unit to travel in alignment with the mandrels at predetermined times, means for shifting one of said spiders with respect to the other to cause operation of the various units carried by the spiders to simultaneously cause placing of a cup bottom on one of said mandrels, crimping of a portion of a cup body blank around a portion of the cup bottom on a second mandrel, and ironing of the crimped portion of a cup on a third mandrel, shiftable spinning means operated from the machine at predetermined times for rolling the top edges of the cups to form rim beads, means for releasing the grippers, means adapted to be projected outwardly from the ends of the mandrels at predetermined times to release the finished cups on the mandrels, and means operated from the machine for discharging the released cups in the final position of translation of the mandrels.

2. A cup making machine comprising a rotatable turret wheel, means for rotating the same, mandrels rotatably supported on said turret wheel, means for intermittently rotating the mandrels and holding said mandrels against rotation, means for feeding a plurality of cup blanks to the mandrels from different directions, means for partially forming the blanks with respect to one another to partially form cups out of said blanks, a spider, means for rotating the spider in timed relation with the rotation of the turret wheel, a plurality of finishing mechanisms carried by the spider and acting on the bottom portions of the cups on the mandrels to complete the finishing of the base portions of the cups and shiftable spinning dies for engagement with the upper edges of the cups to deflect and roll said edges to form rim beads.

3. A cup making machine comprising a rotatable turret wheel, mandrels rotatably mounted thereon, means for delivering cup bottoms and cup body blanks to said mandrels, means for forming the cup body blanks around the cup bottoms, a rocking spider, cup bottom finishing mechanisms carried by the spider, an auxiliary rocking spider connected with the cup bottom finishing mechanisms and means for moving said spiders together at predetermined times to cause the cup bottom finishing mechanisms to engage the partially formed cups on the mandrels to finish the bottoms of the cups.

4. A cup making machine comprising a rotatable turret wheel, rotatable mandrels carried by the turret wheel, means for feeding cup bottoms and glued cup body blanks to the mandrels, means for forming the cup body blanks around the cup bottoms, a main rocking spider, cup bottom finishing mechanisms carried by the main spider, an auxiliary spider shiftably mounted adjacent the main spider and connected with said cup bottom finishing mechanisms, means for simultaneously rocking said spiders at predetermined times to cause the same to travel in timed relation with the rotatable turret wheel, means for shifting the auxiliary spider with respect to the main spider to operate and move the cup bottom finishing mechanisms into engagement with the cups on said mandrels to complete the bottoms of the cups, rotatable and shiftable rim forming dies carried by the turret wheel adjacent the inner ends of the mandrels, means for shifting said dies into engagement with the upper margins of the cups to deflect and curl said margins, means for spinning said dies as they are shifted into engagement with the cups to cause the upper margins of the cups to be curled into tight rim beads to complete the cups, means for releasing the finished cups and means for discharging the finished cups off of the mandrels when released.

5. In a cup forming machine the combination with a mandrel, of means for feeding a bottom blank and a body blank to the mandrel, means for forming the body blank around the mandrel and around the bottom blank, mechanisms for crimping and ironing portions of the body blank against portions of the bottom blank to complete the bottom end of a cup on the mandrel, means adapted to be clamped around the body of the cup below the upper margin of the cup, a rotatable and shiftable rim forming die means, and mechanisms for shifting and spinning the die means into engagement with the upper end of a cup to curl the same into a rim bead.

6. In a cup making machine the combination with a cup forming mandrel, of a bottom blank punching, flanging and feed means adapted to deliver a flanged bottom blank to said mandrel, means for delivering a glued cup body blank to said mandrel to be wound around the flanged bottom blank, cup bottom finishing mechanisms for crimping and ironing the bottom portion of the cup on the mandrel, a rotatable and shiftable spider for actuating said cup bottom finishing mechanisms, and a spinning die means shiftable into engagement with the open end of the cup to spirally curl the upper edge of the cup into a rim bead.

7. A cup forming machine comprising a rotatable turret wheel, mandrels carried by the turret wheel, a stationary presser over which the mandrels are adapted to roll, mechanisms for delivering cup bottoms and cup body blanks to said mandrels, a main spider adapted to advance with the turret wheel, cup finishing mechanisms carried by the main spider, a shiftable auxiliary spider adapted to advance with the main spider and with the turret wheel, means for shifting the auxiliary spider with respect to the main spider to cause the cup finishing mechanisms to coact with the mandrels to form the body blanks around the cup bottoms to form cups, and means for releasing and discharging the cups from the mandrels.

8. A cup forming machine comprising a rotatable turret wheel, a stationary presser, mandrels carried by the turret wheel for coaction with the presser, a main spider, a cup bottom placing mechanism carried by the main spider for delivering and holding cup bottoms on the outer ends of the mandrels, a cup crimping mechanism carried by the main spider, a cup ironing mechanism carried by the main spider, an auxiliary spider shiftably mounted with respect to the main spider, means for simultaneously rotating the main spider and said auxiliary spider, means for delivering cup body blanks to the mandrels, to be wound around the mandrels and around the cup bottoms thereon, means for shifting the auxiliary spider with respect to the main spider to cause the mechanisms carried by the main spider to coact with the mandrels to finish the bottoms of the cups and spinning dies movable into engagement with the upper ends of the cups to form rim beads thereon.

9. A cup forming machine comprising a rotatable turret wheel, mandrels carried thereby, means for feeding cup bottoms and cup body blanks to the mandrels, a pair of spiders, cup finishing mechanisms carried by said spiders, means for simultaneously advancing the pair of spiders with the turret wheel, and means for shifting one of said spiders with respect to the other to actuate the mechanisms carried by said spiders and cause said mechanisms to coact with the mandrels to finish the bottoms of the cups.

10. A cup forming machine comprising a rotatable turret wheel, mandrels carried by the turret wheel, means for delivering cup bottoms and cup body blanks to the mandrels, means for forming the cup body blanks around the cup bottoms, a pair of spiders, a plurality of cup finishing mechanisms carried by said spiders, means for simultaneously advancing said spiders with the turret wheel to cause the cup finishing mechanisms to advance in alignment with the mandrels, means for shifting one of said spiders with respect to the other to cause the cup finishing mechanisms to coact with the mandrels and a single driving means for actuating both the means for simultaneously advancing the spiders and the means for shifting one of said spiders with respect to the other.

11. A cup forming machine comprising a rotatable turret wheel, mandrels carried thereby, means for delivering cup bottoms and cup body blanks to said mandrels to be formed into cups, a pair of spiders, a cup bottom holding mechanism and cup bottom finishing mechanisms connecting said spiders, means for advancing the spiders with the turret wheel, means for shifting one of said spiders with respect to the other to cause operation of the mechanisms carried by said spiders to finish the bottoms of the cups carried by the mandrels, shiftable rim forming means coacting with the upper ends of the cups, and means for spinning the shiftable rim forming means to form spirally curled rim beads on the cups to finish the same.

12. A cup forming machine comprising a rotatable turret wheel, mandrels carried thereby, a pair of rocking spiders, a cup bottom placing and holding mechanism and cup bottom finishing mechanisms connecting said spiders, means for delivering cup body blanks to the mandrels, operating means for simultaneously rotating the spiders to advance the same with the turret wheel and the mandrels carried thereby, actuating means for shifting one of said spiders with respect to the other to cause operation of the mechanisms carried by the spiders, a double driving member for driving both the operating means and the actuating means whereby the cup body blanks are formed around the cup bottoms to form flat bottom cups.

13. In a cup forming machine the combination with a pair of rocking spiders, a plurality of cup finishing mechanisms connecting said spiders, a mandrel, means for delivering a cup bottom and a cup body blank to said mandrel, means for advancing the mandrel into alignment with the mechanisms carried by said spiders, and means for moving one of said spiders with respect to the other to cause operation of the mechanisms into coacting relation with the mandrel to complete the forming of a cup on the mandrel.

14. In a cup forming machine the combination with a rotatable turret wheel having cup forming mandrels thereon, of a rotatable main spider, an auxiliary spider, a cup bottom placing mechanism, a cup crimping mechanism, and a cup ironing mechanism supported on said main spider and connected with the auxiliary spider, and means for moving the auxiliary spider relative to the main spider to cause the three mechanisms carried by the main spider to simultaneously coact with three of the mandrels carried by the turret wheel.

15. In a cup making machine the combination with a rotatable turret wheel having a plurality of cup forming mandrels thereon, a mechanism for placing and holding a cup bottom against one end of a mandrel, means for delivering a cup body blank to the side of the mandrel, to be formed around the mandrel and around the cup bottom, a rocking member for supporting the cup bottom holding and placing mechanism, a cup bottom crimping mechanism and a cup bottom ironing mechanism also supported on the rocking member, means for reciprocating the rocking member to alternately cause advancement of the mechanisms on the rocker member into alignment with the mandrels on the turret wheel and means shiftable with respect to the rocking member to simultaneously cause operation of the different mechanisms carried by the rocker member to deliver and hold a cup bottom on one of the mandrels, deflect and crimp a portion of a cup body blank around a portion of the cup bottom on another mandrel, and iron the crimped portions of a cup on still another mandrel by the coaction of the ironing mechanism with said mandrel.

16. In a cup making machine the combination with a rotatable turret wheel, of cup forming mandrels thereon, a rocker member, a cup bottom placing and holding mechanism carried by the rocker member, a crimping mechanism and an ironing mechanism also carried by the rocker member, means for punching and forming a cup bottom, a transfer device for receiving the cup bottom and delivering the same to the cup bottom placing and holding mechanism on the rocker member, a second rocker member connected with the mechanisms on said first mentioned rocker member, means for delivering cup body blanks to the mandrels, means for simultaneously rocking the rocker members and causing the second rocker member to be shifted with respect to the first mentioned rocker member to simultaneously cause operation of the mechanisms carried by the first mentioned rocker member and coaction of said mechanisms with the mandrels to cause placing of a cup bottom against one end of one of the mandrels, crimping of a portion of a cup body blank around a portion of a cup bottom on another mandrel and ironing of the crimped portion of a cup on a third mandrel.

17. In a cup making machine the combination with a cup forming turret wheel, and the forming mandrels thereof, of a pair of rocker spiders, a plurality of cup forming mechanisms supported by and connecting said rocker spiders, means for alternately rocking said spiders in timed relation with the rotation of the turret wheel, means for shifting one of said spiders with respect to the other to cause operation of the cup forming mechanisms into coacting relation with the mandrels, a common control for governing both the means for rocking the spiders and for shifting one of said spiders with respect to the other and driving means for operating the turret wheel and said common control.

18. In a cup forming machine the combination with a rotatable turret wheel and the cup forming mandrels thereof, of a three armed rocking spider, a cup bottom placing and holding mechanism on one of said arms, a crimping mechanism on another of said arms and an ironing mechanism on the third arm of said spider, an auxiliary spider connected with the mechanisms on said rocking spider, means for simultaneously rocking said spiders in timed relation with the advance of the mandrels by the turret wheel, means for causing shifting of the auxiliary spider with respect to the rocking spider to simultaneously operate all of the mechanisms carried by the rocking spider and move said mechanisms into coacting engagement with the mandrels on the turret wheel, a double cam control for governing the operation of the spider actuating means and driving means for operating the double cam control and the turret wheel in timed relation.

19. In a cup making machine the combination with a turret wheel having forming mandrels thereon, of a rocking spider pivotally mounted adjacent the turret wheel, a cup bottom handling mechanism carried by the spider, a crimping mechanism on the spider, an ironing mechanism on said spider, means for operating said mechanisms in coacting relation with the mandrels, and means operable by the rocking spider for causing rotation of the ironing mechanism.

20. In a cup making machine the combination with a turret wheel and a forming mandrel thereof, of a rocking spider mounted adjacent thereto, an ironing mechanism supported on said spider, means for rocking the spider and moving the ironing mechanism into coacting relation with a cup on said mandrel, a stationary guide member, and means pivotally supported on said spider and engaged with said stationary guide member to rotate the ironing mechanism when the spider is actuated.

21. In a cup making machine the combination with a turret wheel and a forming mandrel thereof, of a pivoted spider, a cup ironing mechanism carried by said spider, means for rocking the spider and causing the ironing mechanism to be moved into engagement with a cup on said mandrel, a stationary guide member, a gear forming part of the ironing mechanism, and a gear segment pivotally mounted on the spider and meshing with said gear, said gear segment including means coacting with the stationary guide member to cause the gear segment to rotate the ironing mechanism when engaged with a cup on the mandrel.

22. In a cup forming machine the combination with a rotatable turret wheel and a cup forming mandrel thereof, of a pivoted spider, an ironing mechanism supported on the spider, means for operating the spider to cause the ironing mechanism to advance in aligned relationship to the mandrel, means for moving the ironing mechanism into coacting engagement with a cup on the mandrel, a stationary guide member, a gear forming part of the ironing mechanism, a gear segment pivotally mounted on the spider and in mesh with said gear, and a roller carried by the gear segment and coacting with the stationary guide member to operate the gear segment and rotate the ironing mechanism to iron a cup on the mandrel.

23. In a cup making machine the combination with a rotatable turret wheel and a cup forming mandrel thereon, of a pivoted spider, means for rocking the same, an ironing mechanism supported on the spider and including spring controlled movable ironing members, a gear forming part of the ironing mechanism, a stationary guide member, a gear segment pivotally mounted on said spider and in mesh with said gear and having slidable engagement with said guide member, to cause rotation of the ironing mechanism when the spider is operated and means movable with the spider and relatively shiftable with respect thereto to move the ironing mechanism into engagement with a cup on the forming mandrel and furthermore actuating the spring controlled ironing members to move the same into engagement with the cup to be ironed.

24. In a cup making machine the combination with a traveling cup forming mandrel, of a pivoted support, means for operating the same to cause the same to be advanced with the mandrel, an ironing head slidably supported in said support, ironing members movably mounted in said ironing head, means for moving the ironing head into engagement with the cup on said mandrel and also causing actuation of the ironing members into coacting engagement with the cup, and mechanisms operable by the movement of the pivoted support to cause rotation of the ironing head and said ironing members with respect to the cup to iron the same.

25. In a cup forming machine the combination with a rotatable turret wheel and the cup forming mandrels thereof, of a pivoted main spider member, a plurality of cup forming mechanisms supported on said main spider member and including operating parts, an auxiliary spider member connected with said mechanisms, means for causing the main spider member and the auxiliary spider member to advance with the advance of the mandrels by the turret wheel, and means for moving the auxiliary spider member relative to the main spider member to move the cup forming mechanisms into engagement with cups on said mandrels and furthermore actuate the operating parts of said mechanisms to finish the portions of the cups on which said mechanisms act.

26. In a cup forming machine the combination with a rotatable turret wheel and a cup forming mandrel thereof, of a pivoted support, means for advancing the support with the advance of the mandrel, a cup bottom placing and holding mechanism on said support, means for punching and forming a cup bottom, a transfer mechanism for receiving a cup bottom and transferring the same into the path of movement of the placing and holding mechanism on said movable support and means for advancing the cup bottom placing and holding mechanism to cause the same to remove the cup bottom from the transfer mechanism and deliver and hold the cup bottom against one end of the mandrel.

27. In a cup forming machine the combination with a traveling cup forming mandrel, of means for punching out and forming a cup bottom, a pivoted support, a cup bottom delivery mechanism mounted on said support, means for operating the pivoted support to cause the cup bottom delivery mechanism to be advanced into alignment with the mandrel and advanced therewith, a transfer mechanism, means for operating the same to receive a cup bottom from the cup bottom punching and forming means and transfer said cup bottom into a position adjacent one end of the cup bottom delivery mechanism, and means for actuating the cup bottom delivery mechanism to advance the same toward the traveling mandrel to deliver the transferred cup bottom against one end of the mandrel and temporarily hold the cup bottom in place.

28. In a cup forming machine the combination with a traveling cup forming mandrel, of means for punching out and forming a cup bottom, a movable support, a cup bottom delivery mechanism supported thereon, a transfer mechanism for receiving a cup bottom from the cup bottom punching and forming means and transferring said cup bottom into a position between the mandrel and said cup bottom delivery mechanism, means for operating the movable support to cause the cup bottom delivery mechanism to advance with the mandrel, means for actuating the cup bottom delivery mechanism to cause the transferred cup bottom to be delivered and temporarily held against one end of the mandrel, means for feeding a cup body blank toward the mandrel, and guide means carried by the movable support for guiding the cup body blank into engagement with the mandrel to be formed around the mandrel and around the cup bottom engaged thereon.

29. In a cup forming machine the combination with a traveling cup forming mandrel, of a movable support, a cup bottom delivery mechanism on said support, means for feeding a cup bottom into the path of movement of the cup bottom delivery mechanism, means for moving the support and actuating the cup bottom delivery mechanism to advance the same with the mandrel and cause the same to deliver and hold the cup bottom against one end of the mandrel, means for feeding a cup body blank toward the mandrel, a guide mechanism carried by the movable support adapted to be moved into a position adjacent the mandrel, and means for operating the guide to receive the advancing cup body blank to guide the same into engagement with the mandrel to be formed around the mandrel and the cup bottom carried thereby to produce a cup.

30. In a cup forming machine the combination with a traveling mandrel, of a cup bottom forming mechanism, a cup bottom delivery mechanism, means for moving the same toward and advancing the delivery mechanism with the mandrel, to engage and hold a cup bottom against one end of the mandrel, and a reciprocating transfer mechanism for receiving a cup bottom from the punching and forming mechanism and delivering the cup bottom to the delivery mechanism.

31. In a cup forming machine the combination with a traveling mandrel, of means for feeding a cup body blank toward the mandrel, a pivoted support, a main guide member secured on said support, an auxiliary guide member pivotally mounted on said main guide member, and a stationary control for operating the auxiliary guide member to position the same with respect to the main guide member to guide the cup body blank as it is advanced into engagement with the traveling mandrel.

32. In a cup forming machine the combination with a cup forming mandrel, means for feeding a cup bottom and a cup body blank to the mandrel to be transformed into a cup, means for crimping one end of the cup body around the cup bottom, rim forming means, means for advancing the rim forming means into contact with the end of the cup opposite the bottom to brace the body of the cup during a crimping operation, said advancing means constructed to further advance the rim forming mechanism after a crimping operation, and means for spinning the rim forming mechanism during the final advance thereof to cause the upper margin of the cup to be spirally rolled into a tight rim bead.

33. In a cup forming machine the combination with a cup forming mandrel, of means for feeding cup blanks to the mandrel to be formed into a cup, means for crimping one end of the cup, a rim forming mechanism, means for intermittently advancing the rim forming mechanism to first move the rim forming mechanism into contact with the open end of the cup to serve as a stop during a crimping operation and then acting to continue the advance of the rim forming mechanism, and means for spinning the rim forming mechanism during the final advance thereof to roll the open rim of the cup into a tight rim bead.

34. In a cup forming machine the combination with a cup forming mandrel, of means for feeding cup blanks thereto to be formed into a cup, a cup finishing mechanism adapted to be moved into engagement with one end of the cup, a rim forming mechanism, means for intermittently advancing the rim forming mechanism to first advance the same into contact with the opposite end of the cup to serve as a brace for the cup during an operation of the finishing mechanism and then adapted to further advance the rim forming mechanism, and means for rotating the rim forming mechanism during the final advance thereof to cause the open end of the cup to have a tight rim bead rolled thereon with the finishing mechanism serving as a brace for the opposite end of the cup.

35. In a cup making machine the combination with a cup forming mandrel, of means for feeding a plurality of blanks to the mandrel to be formed into a cup, means for finishing one end of the cup, a rim forming mechanism, and means for first moving the rim forming mechanism into contact with the open end of the cup during a finishing operation of the opposite end of the cup and then causing a further advance of the rim forming mechanism to roll a tight bead on the open end of the cup.

36. In a cup forming machine the combination with a cup forming mandrel, of means for feeding cup blanks to the mandrel to be formed into a cup, means adapted to be advanced into engagement with one end of the cup to finish said end of the cup, spinning means for engaging and finishing the opposite end of the cup and mechanisms for intermittently advancing the spinning means.

37. In a cup forming machine the combination with a cup forming mandrel, of means for feeding a cup blank to the mandrel to be formed into a cup, a rim forming mechanism, means for intermittently advancing the rim forming mechanism into engagement with the rim of the cup, and means for spinning the rim forming mechanism during the final advance thereof to form a rolled rim on the cup.

38. In a cup forming machine the combination with a cup forming mandrel, of means for feeding cup blanks to the mandrel to be formed into a cup, and mechanisms movable into engagement with opposite ends of the cup to finish the ends of the cup, one of said mechanisms adapted to be intermittently advanced to first serve as a stop when the other mechanism acts on the cup and then adapted to serve as a cup finishing mechanism while said other mechanism acts as a stop for the cup.

39. In a cup forming machine the combination with a cup forming mandrel having a cup thereon, means for holding the cup on the mandrel, a die mechanism movable into engagement with one end of the cup to spin a spirally rolled bead thereon, means for intermittently advancing the die mechanism, and means for rotating the die mechanism during the final advance thereof.

40. The combination with a cup forming mandrel having a cup thereon, means for holding the cup on the mandrel, a die mechanism, means for intermittently advancing the die mechanism into engagement with one end of the cup and means for rotating the die mechanism during the final advance thereof to form a rolled bead rim on the cup.

41. In a cup forming machine the combination with a cup forming mandrel having a cup engaged thereon, of means movable into engagement with opposite ends of the cup to finish the ends of the cup, said means acting alternately as stops and as finishing means to assist one another in finishing the ends of the cup.

42. In a cup forming machine the combination with a cup forming mandrel having a cup engaged thereon, of cup holders, means for consecutively moving said holders into engagement with opposite sides of the cup, a die mechanism movable into engagement with one end of the cup and a traveling belt for spinning the die mechanism to form a tightly rolled rim bead on the cup.

43. In a cup forming machine the combination with a forming mandrel, of means for feeding cup blanks thereto, a plurality of holding mechanisms, means for consecutively moving the holding mechanisms into engagement with the body of the cup formed on the mandrel, a rim forming device, means for advancing the rim forming device into engagement with one end of the cup on the mandrel and a traveling belt disposed in the path of travel of the rim forming device to form a spirally rolled rim bead on the cup adjacent the holding mechanisms.

44. In a cup forming machine the combination with a forming mandrel, of means for feeding and rolling a cup blank around the mandrel to form a cup body, a plurality of holding means, means for consecutively moving the holding means into engagement with the cup body, and a shiftable and rotatable die mechanism movable into engagement with one end of the cup body and coacting with the holding means to form a rim bead on the cup body.

45. In a cup forming machine the combination with a cup forming mandrel, of means for feeding a cup blank to the mandrel to be wound therearound, a pair of clamping members, means for consecutively moving the clamping members into engagement with the blank as it is being wound on the mandrel, a die mechanism, a control for intermittently advancing the die mechanism and operating the means which governs the operation of the clamping members and means for rotating the die mechanism during one of the stages of advance thereof to cause a margin of the blank to be rolled into a tight rim bead with the cooperation of the clamping members.

46. In a cup forming machine the combination with a cup carrying mandrel, means for translating the mandrel through a predetermined path, a rim forming means adjacent one end of the mandrel, means for advancing the same into engagement with one end of the cup, and a traveling belt positioned in the path of travel of the rim forming means to rotate the same and form a spirally rolled rim bead on the cup.

47. In a cup forming machine the combination with a traveling cup carrying mandrel, of a rim forming means traveling therewith, and movable means positioned to be contacted by the rim forming means to rotate the same and form a rim bead on the cup.

48. In a cup forming machine, a rotatable turret wheel having cup forming mandrels thereon, a device for clamping a cup bottom against the end of one of said mandrels, means for mounting said device for predetermined rotational movement with the turret wheel, and means for rotating said device in a direction reverse to said turret wheel for clamping a blank against the end of the next succeeding mandrel.

49. In a cup forming machine, a rotatable turret wheel having cup forming mandrels thereon, means for holding a bottom blank against the end of one mandrel, means for crimping a cup upon another mandrel, said means being rotatable with said turret wheel for a predetermined circular movement, and also being movable in an opposite direction to the rotation of said turret wheel.

50. In a cup forming machine, the combination with a mandrel, of a rotatable blank feeding device for supplying a blank to said mandrel, fingers for guiding said blank from said feeding device to said mandrel, one of said fingers pivotally supported on the other, a travelling support for said fingers, and a stationary member position to co-act with the pivoted finger to move the same into a guiding position.

51. In a cup forming machine, the combination with a cup forming mandrel, of a blank transfer mechanism for supplying blanks to said mandrel, and means for receiving a blank delivered by said transfer mechanism and guiding it to said mandrel, said means comprising a travelling support, a guide member secured thereon, a second guide member pivoted on the first guide member, and a control for moving the second guide member into a closed position when the movable support reaches a predetermined position.

52. In a paper cup forming machine, a cup forming mandrel, a clamp for holding a bottom blank against the outer end of said mandrel, mechanism for forming the bottom blank, and a transfer device for transferring the formed bottom blank between said clamp and the end of the mandrel.

53. In a paper cup forming machine, a cup forming mandrel, a clamp for holding a bottom blank against the end of the mandrel, means for forming the bottom blank including a plunger, and a transfer device for receiving a blank from the plunger and transferring the same between said clamp and the end of said mandrel.

54. In a cup forming machine, a cup forming mandrel, means for holding a cup bottom against the mandrel, and an oscillating transfer means for delivering a cup bottom between the mandrel and said holding means.

55. In a cup forming machine, the combination with a cup forming mandrel, of a cup bottom former, and a plurality of oscillating means timed to receive a cup bottom from the former and deliver the cup bottom to the mandrel.

56. In a cup forming machine, the combination with a cup forming mandrel, of a cup bottom former, a plurality of oscillating means for relaying a cup bottom from said cup bottom former into a position adjacent one end of said mandrel, and means carried by one of said oscillating means for delivering the cup bottom against one end of the mandrel.

57. In a cup forming machine, a rotatable cup forming wheel, and oscillating means co-acting therewith during the rotation of said wheel for finishing the bottom ends of cups carried on said wheel.

58. In a cup forming machine, the combination with rotatable cup carrying means, a plurality of cup finishing means oscillatable with respect thereto, and means for axially adjusting one of said cup finishing means to finish cups on the rotatable cup forming means during the continuous rotation of said means.

59. In a cup forming machine, the combination with a pair of oscillatable spiders, of cup finishing means connecting the spiders, and means for shifting one of said spiders with respect to the other to actuate the cup finishing means.

60. In a cup forming machine, the combination with a pair of supporting members, of means for oscillating the same, cup finishing means carried by said members, and control means for moving one of said members relative to the other to operate the finishing means.

61. In a cup forming machine, the combination with a travelling cup former, of a cup finisher, means actuating the same to travel with the cup former, and control means for operating the finisher to co-act with the cup former to finish cups thereon.

62. In a cup forming machine, the combination with a travelling cup former, of a rim forming means travelling therewith, and a travelling belt intercepting the path of travel of the rim forming means to rotate the rim forming means to form a rim on a cup on the cup former.

63. In a cup forming machine, the combination with a travelling cup former, of a travelling belt, and a rim former travelling with the cup former into contact with the belt to be rotated thereby to form a rim on a cup carried by the cup former.

64. In a cup forming machine, the combination with a travelling cup former, of a travelling belt, a cup finisher movable into contact with the belt and to receive a rotatable drive therefrom to finish a cup on the cup former.

65. In a cup forming machine, the combination with a cup former, of cup finishing mechanisms alternately movable into engagement with opposite ends of a cup on the cup former to finish the ends of the cup, and movable means positioned to be contacted by one of said finishing mechanisms during the engagement thereof with a cup to spin said finishing mechanism and form a rolled rim on the cup.

66. In a cup forming machine, a movable cup carrying member, a plurality of cup making mechanisms adjacent the path of said member, automatic means to move each of said mechanisms into play at the proper time during the travel of a cup on said member to perform an operation on said cup, and presser means to maintain the stock of the body portion of said cup under tension during the operations of said mechanisms.

67. In a cup forming machine, the combination with a travelling cup former, of a rim forming means associated therewith, means to bring said rim forming means into play to form a rim on a cup on said former, and presser means disposed in the path of a cup on said former and arranged to maintain the stock of the body of said cup under tension during the forming of said rim.

68. In a cup forming machine, the combination with a travelling cup former, of finishing means disposed adjacent the path of a cup on said former, presser means in the path of a cup on said former and arranged to bear against a travelling cup and maintain the stock of said cup under tension, and means to actuate said finishing means while said cup is in engagement with said presser means.

69. In a cup forming machine, a travelling mandrel arranged to carry a cup body and a cup bottom, means for maintaining the stock of said cup body under tension, and crimping means for folding said cup body about said cup bottom while the stock of said cup body is under tension.

70. In a cup forming machine, means for applying adhesive to a margin of a cup blank, a travelling mandrel having an opening therein for the reception of a margin of a cup blank, grippers associated with said mandrel for holding the received margin of said blank, said mandrel being rotatable to wind said blank therearound with said adhesive securing together overlapped margins of said blank, and means arranged to exert pressure on the stock of said blank in a direction away from said grippers to maintain said stock under tension while the adhesive hardens.

71. In combination in a container making machine, a forming unit capable of supporting a blank in container shape, a pressure unit arranged for ironing contact with said blank in a direction to maintain the stock of the blank under tension, one of said units being movable relatively to the other, and finishing mechanism operable on said blank during the continuation of said ironing contact.

72. In a cup forming machine, a rotatable turret wheel, mandrels carried by said turret wheel for forming cups, oscillatory mechanism for acting upon the ends of the cups having a predetermined arcuate movement with said turret wheel, means for moving said mechanism towards and away from the cups, and means operable after said mechanism has been moved away from a cup to restore the mechanism to its original position in time to be moved into engagement with the next approaching cup.

73. In combination in a container making machine, means for forming a blank into container body shape and holding the same and a bottom member, said blank being formed about said bottom member with portions adhesively secured together, crimping means to fold the body and bottom portions together, and mechanisms simultaneously operable to iron said body portion and the fold between the body and bottom portions.

74. In combination in a container making machine, a travelling unit capable of holding a blank in container body form, a bottom member to complete the container also being held in position adjacent an end of the body, portions of said container being adhesively secured together, crimping means to form a fold between the body and bottom of the container, and mechanisms operable during continuous travel of said unit to simultaneously iron the container body and said fold.

75. In a container making machine, a work carrying turret wheel, a shaft carrying said wheel, a rocking spider supported by said shaft, means for moving said spider a predetermined distance with said wheel and restoring the spider to initial position after such movement, and mechanism carried by said spider for acting upon work carried by said wheel.

76. In a container making machine, a work carrying turret wheel, a shaft carrying said wheel, a rocking spider supported by said shaft, means for moving said spider a predetermined distance with said wheel and restoring the spider to initial position after such movement, and mechanism carried by said spider for acting upon work carried by said wheel, said mechanism being movable relatively to said shaft towards and away from work carried by said wheel.

77. In a container making machine, a continuously movable work carrying member, a container former on said member, means to rotate said former about its own axis during the mounting of a blank on said former, other mechanisms adjacent the translatory path of said former and operable successively to act on the container carried by the former during the continuous bodily movement of the former imparted by the work carrying member, and means to hold said former stationary relatively to its own axis during the operation of said other mechanisms.

78. In a container making machine, a movable forming unit capable of supporting a blank in container shape, finishing means disposed adjacent the path of said unit for acting upon the blank carried by said unit, and pressure means providing sliding contact over the blank on said forming unit to maintain the stock of said blank peripherally stretched during the operation of said finishing means.

79. In a container making machine, a forming unit capable of supporting a blank in container shape, finishing means to act upon a blank supported by said forming unit, and a pressure unit positioned for slidable ironing contact on a blank on the forming unit, one of said units being movable relatively to the other while said finishing means acts upon the blank.

80. In a container making machine, a forming unit capable of supporting a blank in container shape, finishing means to act on a blank supported by said unit, and a pressure unit positioned to bear against the blank with slidable ironing contact therebetween tending to peripherally stretch the stock of the blank during the forming of the blank on said forming unit and the operation of said finishing means, one of said units being movable relatively to the other.

81. In a container making machine, a mandrel capable of gripping a marginal edge of a blank, means for rotating said mandrel to wind a blank therearound with marginal portions of the blank adhesively held, finishing means for acting on a blank on said mandrel to complete the container, and pressure means arranged to exert slidable ironing pressure on the blank in a direction away from the gripped edge thereby tending to peripherally stretch the stock of the blank during the setting of the adhesive and the operation of said finishing means.

82. In a container making machine, a mandrel capable of gripping a blank adjacent the edge thereof, means for rotating said mandrel to wind the blank therearound to form the body of a container, means to apply a bottom blank to said mandrel, crimping means to join the body blank with the bottom blank, and pressure means arranged to exert slidable ironing pressure on said body blank tending to peripherally stretch the stock of the body portion during the forming thereof and the operation of said crimping means.

83. In a container making machine, a former capable of supporting a blank in container shape, means for translating said former, finishing mechanism adjacent the translatory path of said former to act upon the blank on the former, and a fixed ironing member adjacent the path of said former positioned so that the blank on said former will slide against said member during the operation of said finishing mechanism.

84. In a container making machine, a former, means for translating said former, means to rotate said former about its own axis to wind a blank therearound, finishing means adjacent the path of said former to act on the blank, pressure means for ironing contact with the blank, and said means for rotating the former becoming inoperative during the time of operation of said finishing means and while said pressure means are still acting on the blank.

85. In a container making machine, a former, means for continuously bodily moving said former, drive means to rotate said former about its own axis to wind a blank therearound, container making mechanism adjacent the path of said former to act on the blank, and said drive means being inoperable during the operation of said mechanism so that said former is stationary relative to its axis during the operation of said mechanism.

86. In a container making machine, a carrier element, drive means for continuously rotating said element, a former carried by said element, mechanism operable to rotate said former about its own axis while it is being carried by said element to wind a blank around the former and further operable to hold said former stationary relatively to its axis until a container including said blank is formed, and container making mechanism operable upon the blank after the same has been wound on said former.

87. In a container making machine, a former, means for continuously translating said former, means for moving said former relatively to its own axis to shape a container blank carrying adhesive thereon with overlapping parts of the blank held by the adhesive, said second mentioned means being inoperable to move said former relatively to its axis after the blank is shaped and until the container is completed, and pressure means positioned to provide sliding ironing contact on the blank tending to peripherally stretch the stock of the blank while the adhesive is setting and while the former is continuously translated.

88. In a container making machine, a translatable former shaped to receive a body blank and a bottom blank, container making mechanism operable to join the blanks to form a container, and pressure means arranged for slidable ironing contact with the body blank tending to peripherally stretch the stock of the body blank and maintain the stock under tension during the joining of the blanks.

89. In a container making machine, a traveling container carrying mandrel, rim forming means traveling therewith, movable means positioned to be contacted while in motion by said rim forming means to drive the latter to form a rim on the container, and means operable to maintain said mandrel stationary relatively to its own axis during the rim forming operation.

90. In a container making machine, movable work carrying means, a plurality of container formers carried in spaced relationship by said work carrying means, oscillatory cup making mechanism separate from said work carrying means but capable of acting on containers carried by said formers, said mechanism having a predetermined movement with said work carrying means, and actuating means to move said mechanism into and away from operative position relatively to the containers and to restore said mechanism to original position relatively to said work carrying means in time to act on the next approaching container.

91. In a container making machine, a container former movable to form a blank into container shape, translatory means carrying said former, and tension applying means arranged to stationary tension the stock of the blank during the initial action of said former and maintain such tension during translatory movement of said former by said means.

92. In a container making machine, translatory carrying means, a mandrel carried by said means and rotatable about its own axis to wind a blank therearound into container shape, and presser means arranged adjacent the translatory path of said mandrel to apply tension to the stock of the blank during the forming of the blank around said mandrel and maintain such tension during further translatory movement of said mandrel.

93. In a container making machine, a translatory work carrier, means for continuously moving said carrier at variable speed, a rotatable forming mandrel carried by said work carrier, means responsive to the translatory movement of said carrier to rotate said mandrel during a portion only of the translatory movement, and means to hold said mandrel against rotation relative to its own axis during the remainder of the translatory movement.

CESARE BARBIERI.